United States Patent
Takeda et al.

(10) Patent No.: US 11,983,855 B2
(45) Date of Patent: May 14, 2024

(54) IMAGE PROCESSING APPARATUS, IMAGE PROCESSING METHOD, AND PROGRAM

(71) Applicant: NIPPON TELEGRAPH AND TELEPHONE CORPORATION, Tokyo (JP)

(72) Inventors: Shoichiro Takeda, Musashino (JP); Kazuki Okami, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 373 days.

(21) Appl. No.: 17/595,047

(22) PCT Filed: May 31, 2019

(86) PCT No.: PCT/JP2019/021775
§ 371 (c)(1),
(2) Date: Nov. 8, 2021

(87) PCT Pub. No.: WO2020/240836
PCT Pub. Date: Dec. 3, 2020

(65) Prior Publication Data
US 2022/0198614 A1  Jun. 23, 2022

(51) Int. Cl.
*G06T 5/70* (2024.01)
*G06T 7/207* (2017.01)
*G06V 10/60* (2022.01)

(52) U.S. Cl.
CPC ............... *G06T 5/70* (2024.01); *G06T 7/207* (2017.01); *G06V 10/60* (2022.01); *G06T 2207/10016* (2013.01); *G06T 2207/20182* (2013.01)

(58) Field of Classification Search
CPC ......... G06T 7/0016; G06T 5/70; G06T 7/207; G06T 2207/10016; G06T 2207/20182; G01J 3/453; G01J 9/00; G06V 10/60
See application file for complete search history.

(56) References Cited

U.S. PATENT DOCUMENTS

| | | | | |
|---|---|---|---|---|
| 2013/0335740 A1* | 12/2013 | Ishimaru | ............... | G01J 3/0224 356/365 |
| 2016/0034746 A1* | 2/2016 | Harada | ................... | G06V 20/10 382/154 |

FOREIGN PATENT DOCUMENTS

| | | | | |
|---|---|---|---|---|
| CN | 105191313 A | * | 12/2015 | ........... H04N 19/117 |
| CN | 106068531 A | * | 11/2016 | ......... G06K 9/00825 |

(Continued)

OTHER PUBLICATIONS

Neal Wadhwa, Michael Rubinstein, Fredo Durand, William T. Freeman, "Phase-based video motion processing", ACM Transactions on Graphics. vol. 32. (2013).

(Continued)

*Primary Examiner* — Dung Hong
(74) *Attorney, Agent, or Firm* — Harness, Dickey & Pierce, P.L.C.

(57) ABSTRACT

An image processing apparatus includes a change detection unit configured to detect phase changes in multiple predetermined directions from among phase changes in a luminance image in units of mutually different resolutions, and a reliability estimation unit configured to estimate reliability of the detected phase change based on temporal amplitude change information in the multiple directions determined in the luminance image. The reliability estimation unit may estimate the reliability using an amplitude change of multiple resolutions and using a value of an amplitude change equal to or greater than a predetermined threshold value (Continued)

among images having multiple resolutions. The reliability may become a greater value as the amplitude change becomes larger.

6 Claims, 20 Drawing Sheets

(56) References Cited

FOREIGN PATENT DOCUMENTS

| | | | | |
|---|---|---|---|---|
| JP | 2018040599 A | * | 3/2018 | |
| JP | 2019020365 A | * | 2/2019 | |
| WO | WO-2019146510 A1 | * | 8/2019 | .......... B60W 40/105 |

OTHER PUBLICATIONS

Shoichiro Takeda, Kazuki Okami, Dan Mikami, Megumi Isogai, Hideaki Kimata, "Jerk-Aware Video Acceleration Magnification", IEEE International Conference on Computer Vision and Pattern Recognition (2018).

* cited by examiner

IMAGE PROCESSING APPARATUS, IMAGE PROCESSING METHOD, AND PROGRAM

CROSS-REFERENCE TO RELATED APPLICATIONS

This application is a 371 U.S. National Phase of International Application No. PCT/JP2019/021775 filed on May 31, 2019. The entire disclosure of the above application is incorporated herein by reference.

TECHNICAL FIELD

The present disclosure relates to an image processing apparatus, an image processing method, and a program.

BACKGROUND ART

The amount of change in a subtle motion change of an image in frames of a moving image may be emphasized or attenuated by an image processing apparatus. A technique for adjusting the amount of change in the subtle motion change of the image by the emphasis or attenuation is referred to as "video magnification". The image processing apparatus can visualize a physical phenomenon that is not captured by human vision in the frames of the moving image by the emphasis of the video magnification. The image processing apparatus can also remove unnecessary image fluctuations (for example, shakes, ground vibrations, and the like) mixed in the frames of the moving image from the frames by the attenuation of the video magnification.

When the subtle motion change of the image is detected based on a phase change of a local image in the frame of the moving image, the image processing apparatus applies a temporal filter to the frames. Accordingly, the image processing apparatus can detect a subtle motion change of an image of a subject (see Non Patent Documents 1 and 2).

CITATION LIST

Non Patent Document

Non Patent Document 1: Neal Wadhwa, Michael Rubinstein, Fredo Durand, William T. Freeman, "Phase-based Video Motion Processing", ACM Transactions on Graphics. Vol. 32. (2013).
Non Patent Document 2: Shoichiro Takeda, Kazuki Okami, Dan Mikami, Megumi Isogai, Hideaki Kimata, "Jerk-Aware Video Acceleration Magnification". IEEE International Conference on Computer Vision and Pattern Recognition (2018).

SUMMARY OF THE INVENTION

Technical Problem

However, there is a problem in that an image processing apparatus adjusts not only an amount of change in a meaningful subtle motion change, but also an amount of change in a random noise (meaningless subtle motion change) mixed in an image due to thermal noise of an image sensor or the like. Since quality of the image deteriorates when an amount of change in the random noise is adjusted, it is necessary to reduce the adjustment of the random noise mixed in the moving image in the image processing apparatus.

In view of the above circumstances, an object of the present disclosure is to provide an image processing apparatus, an image processing method and a program capable of reducing adjustment of random noise mixed in a moving image when adjusting an amount of change in a subtle motion change of the moving image.

Means for Solving the Problem

An aspect of the present disclosure is an image processing apparatus including a change detection unit configured to detect, from among phase changes in a luminance image, phase changes in multiple predetermined directions in units of mutually different resolutions, and a reliability estimation unit configured to estimate reliability of a phase change of the phase changes that are detected based on temporal amplitude change information in multiple directions determined in the luminance image.

In the image processing apparatus according to the aspect of the present disclosure, the reliability estimation unit estimates the reliability using a value of an amplitude change equal to or greater than a predetermined threshold value among amplitude changes at multiple resolutions.

In the image processing apparatus according to the aspect of the present disclosure, the reliability becomes a greater value as the amplitude change becomes larger.

The image processing apparatus according to the aspect of the present disclosure further includes a multiplication unit configured to multiply, by the reliability, the phase change that is detected, and a change amount adjustment unit configured to adjust an amount of change in a phase change multiplied by the reliability.

An aspect of the present disclosure is an image processing method executed by an image processing apparatus, the image processing method including detecting, from among phase changes in a luminance image, phase changes in multiple predetermined directions in units of mutually different resolutions, and estimating reliability of a phase change of the phase changes that are detected based on temporal amplitude change information in multiple directions determined in the luminance image.

An aspect of the present disclosure is a program for causing a computer to operate as the image processing apparatus.

Effects of the Invention

According to the present disclosure, it is possible to reduce the adjustment of the random noise mixed in the moving image when adjusting the amount of change in the subtle motion change of the moving image.

DESCRIPTION OF EMBODIMENTS

Embodiments of the present disclosure will be described in detail with reference to the drawings.

First Embodiment

Figure 1:
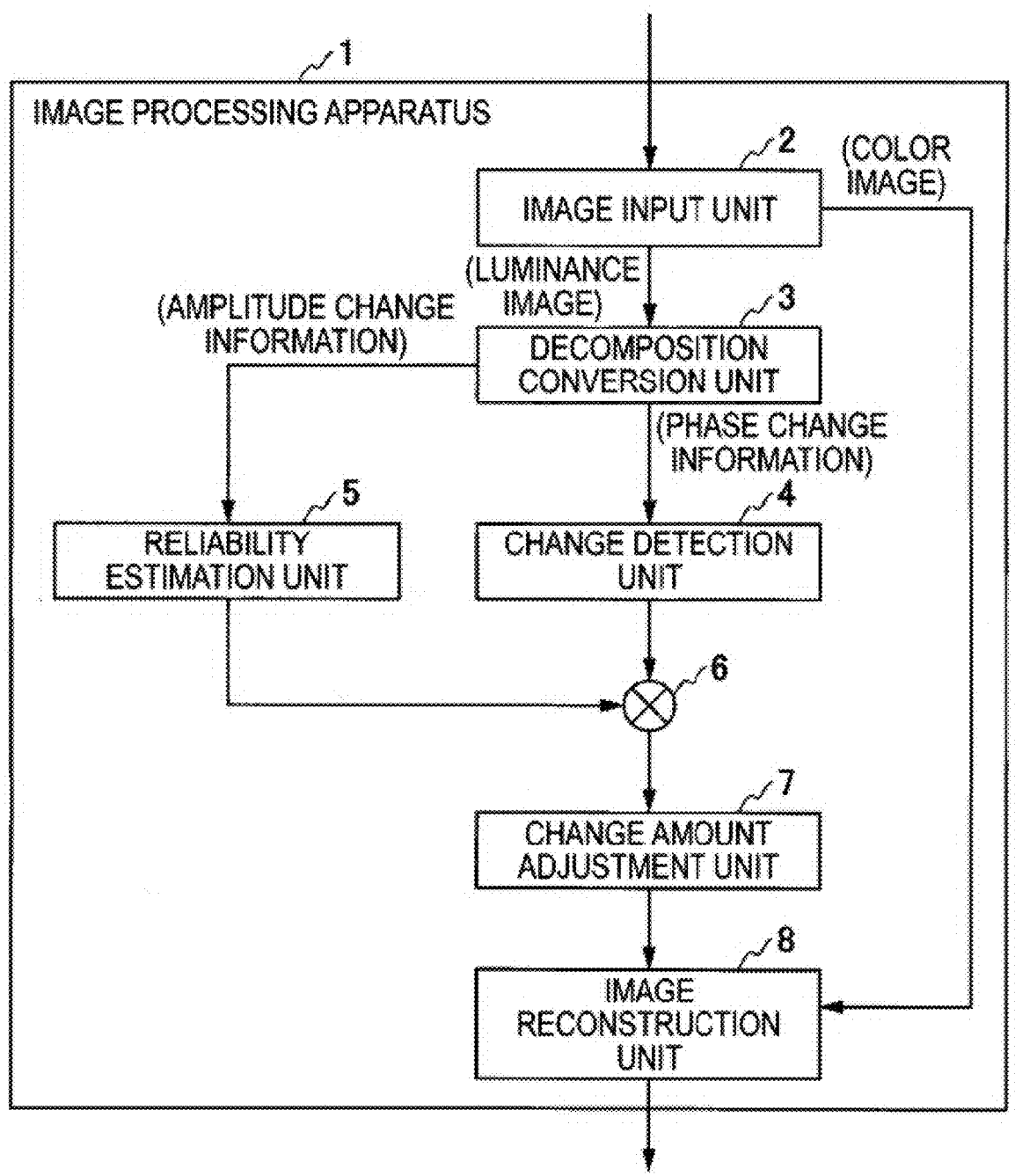
FIG. 1 is a diagram illustrating a configuration example of an image processing apparatus in a first embodiment.

FIG. 1 is a diagram illustrating a configuration example of an image processing apparatus 1 according to a first embodiment. The image processing apparatus 1 is an apparatus that executes a predetermined image processing on a moving image. The predetermined image processing is, for example, image processing of video magnification. The image processing apparatus 1 executes predetermined image processing on the moving image to emphasize or attenuate a specific subtle motion change of a subject.

The image processing apparatus 1 includes an image input unit 2, a decomposition conversion unit 3, a change detection unit (change detector) 4, a reliability estimation unit (reliability estimator) 5, a multiplication unit (multiplier) 6, a change amount adjustment unit (change amount adjuster) 7, and an image reconstruction unit 8. Each functional unit may be combined and provided as a single functional unit, or may be divided and provided as a multiple functional units.

A processor such as a central processing unit (CPU) executes a program stored in a memory which is a nonvolatile recording medium (non-transitory recording medium), and thus, a part or all of functional units of the image processing apparatus 1 is implemented as software. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium such as a storage device such as a hard disk drive built into a computer system. The program may be transmitted via an electrical communication line. A part or all of the functional units of the image processing apparatus 1 may be implemented by using hardware including an electronic circuit (or circuitry) using a large scale integration circuit (LSI), an application specific integrated circuit (ASIC), a programmable logic device (PLD), or a field programmable gate array (FPGA).

Hereinafter, an image representing luminance information of a frame of the moving image is referred to as a "luminance image". Hereinafter, an image representing color information of the frame of the moving image is referred to as a "color image".

The image input unit 2 receives multiple frames of the moving image as the image processing target. The image input unit 2 generates the luminance images and the color images from the multiple frames of the received moving image, for each frame. The image input unit 2 outputs an original resolution luminance image that is an image processing target to the decomposition conversion unit 3. The image input unit 2 outputs an original resolution color image that is an image processing target to the image reconstruction unit 8.

The decomposition conversion unit 3 receives the original resolution luminance image. The decomposition conversion unit 3 converts a luminance change of a pixel at the coordinates (x, y) in the original resolution luminance image at time t of the received moving image to a phase change and amplitude change of each piece of luminance information in multiple directions determined in advance and decomposes the moving image into mutually different resolutions. The multiple directions determined in advance are, for example, multiple directions extending radially from the pixel at the coordinates (x, y) in the frame. For the multiple spatial directions extending radially, for example, 360 degrees around the pixels in the frame are equally divided every 22.5 degrees. The decomposition conversion unit 3 outputs information indicating the phase change of each piece of luminance information in the multiple directions determined in advance as phase change information to the change detection unit 4, and outputs information indicating the amplitude change of each piece of luminance information in the multiple directions determined in advance as amplitude change information to the reliability estimation unit 5.

The change detection unit 4 receives the phase change information. The change detection unit 4 detects a subtle phase change "C"(x, y, t, θ)" in the luminance image having each resolution based on the received phase change information. The change detection unit 4 outputs information indicating the detected subtle phase change in the luminance image (hereinafter referred to as "subtle phase change information") to the multiplication unit 6 for each resolution.

The reliability estimation unit 5 receives amplitude change information. The reliability estimation unit 5 estimates the reliability of the subtle phase change "C"(x, y, t, θ)" based on the received amplitude change information. The reliability of the subtle phase change is reliability that the subtle phase change occurring in the pixel value of the image is caused due to a physical phenomenon other than random noise. The reliability estimation unit 5 estimates the reliability so that the reliability of the subtle phase change occurring in the pixel value of the image due to the random noise mixed in the image due to, for example, thermal noise of the image sensor is lower than the reliability of the subtle phase change occurring in the pixel value of the image due to the physical phenomenon other than the random noise. The reliability estimation unit 5 outputs the estimated reliability to the multiplication unit 6. The reliability estimated by the reliability estimation unit 5 in the present embodiment has a greater value when the amplitude change becomes larger.

The multiplication unit 6 receives the subtle phase change information and the reliability. The multiplication unit 6 multiplies the received subtle phase change information by the reliability for each pixel, and outputs a result of the multiplication (a multiplication result) to the change amount adjustment unit 7. When the multiplication unit 6 multiplies the subtle phase change information by the reliability, the subtle phase change occurring in the pixel value of the image due to the physical phenomenon other than the random noise is detected with high accuracy.

The change amount adjustment unit 7 receives the multiplication result (the phase change multiplied by the reliability) output by the multiplication unit 6. The change amount adjustment unit 7 executes video magnification for the received multiplication result of the multiplication unit 6. That is, the change amount adjustment unit 7 adjusts an amount of change in a subtle phase change (motion change) multiplied by the reliability through emphasis or attenuation. Thus, the change amount adjustment unit 7 generates a luminance image in which the amount of change in the subtle motion change has been adjusted (hereinafter referred to as an "adjusted luminance image") for each resolution. The change amount adjustment unit 7 outputs multiple adjusted luminance images having mutually different resolutions to the image reconstruction unit 8.

The image reconstruction unit 8 (image combination unit) receives the multiple adjusted luminance images having mutually different resolutions and the original resolution color image. The image reconstruction unit 8 (image combination unit) reconstructs an image based on the received adjusted luminance image.

The image reconstruction unit 8 combines the reconstructed original resolution luminance image and the original resolution color image. The image reconstruction unit 8 outputs an image finally adjusted by using the video magnification to a predetermined external device, as the combination result.

The predetermined external device is, for example, a device that executes image processing other than the video magnification, a device that executes image recognition (hereinafter, referred to as an "image recognition device"), or a display device. When the predetermined external device is the image recognition device, the image recognition device may use, as a feature for image recognition, the combination result (image finally adjusted by using the video magnification).

Next, the image processing apparatus 1 will be described in detail. Hereinafter, a symbol above a letter in equations is written immediately before the letter. For example, the symbol "^" above the letter "C" in the equations is written immediately before the letter "C" as in "^C". For example, the symbol "−" above the letter "t" in the equations is written immediately before the letter "t" as in "(−)t". For example, the symbol "~" above the letter "C" in the equations is written immediately before the letter "C" as in "(~)C".

The image input unit 2 acquires multiple frames of the moving image as the image processing target. The image input unit 2 generates, an original resolution luminance image "I(x, y, t)" and an original resolution color image from the multiple acquired frames. "x" represents an x-coordinate in the frame of the moving image (such as the luminance image or the like). "y" represents a y-coordinate in the frame of the moving image (such as the luminance image). "t" represents a time of a frame of a temporal moving image. The image input unit 2 outputs the original resolution luminance image "I(x, y, t)" to the decomposition conversion unit 3. The image input unit 2 outputs an original resolution color image to the image reconstruction unit 8.

The decomposition conversion unit 3 uses a CSF for a luminance change "I(x, y, t)" of a video at a certain place (x, y) and a certain time t of the received original resolution luminance image to convert and decompose the luminance change "I(x, y, t)" of the video into an amplitude change "$A^n$(x, y, t, θ)" and a phase change "$\phi^n$(x, y, t, θ)" in a certain resolution "n" and a certain direction "θ", as in Equation (1) below. The parameter "n" indicates the resolution. In the present embodiment, the configuration using the CSF is described, but the filter is not limited thereto. However, in the following embodiment, a case in which the CSF is used will be described.

[Math. 1]

$$\psi_\theta^n \otimes I(x,y,t) = A^n(x,y,t,\theta) e^{i\phi^n(x,y,t,\theta)} \quad (1)$$

Among the operators described in Equation (1), an operator including a mark "x" in a mark "○" indicates a convolution operator, and "$\psi_\theta$" indicates a CSF at a certain resolution "n" and a certain direction "θ".

The change detection unit 4 detects a subtle change in luminance in the generated luminance image having each resolution. The change detection unit 4 convolves a temporal filter "H(t)" having a frequency response with a subtle change to be emphasized with respect to the phase change "φ(x, y, t, θ)" for each direction in the video having each resolution obtained in the decomposition conversion unit 3 or multiplies the phase change by a spatiotemporal filter "J(x, y, t)" for removing a large change to detect the subtle phase change "$C^n$(x, y, t, θ)" as in Equation (2) below. The change detection unit 4 may not multiply the phase change by the spatiotemporal filter "J(x, y, t)". That is, when the change detection unit 4 detects the subtle phase change "$C^n$(x, y, t, θ)", the change detection unit 4 may not use the spatiotemporal filter "J(x, y, t)".

[Math. 2]

$$C^n(x,y,t,\theta) = J(x,y,t) \cdot (H(t) \otimes \phi^n(x,y,t,\theta)) \quad (2)$$

The operator "○" in Equation (2) indicates multiplication (element-wise product). H(t) indicates a bandpass filter, and "J(x, y, t)" is a jerk filter for the purpose of removing only abrupt change, which is a representative example. The filter used by the change detection unit 4 is not limited thereto.

The subtle phase change "$C^n$(x, y, t, θ)" obtained by the change detection unit 4 includes a "meaningful" subtle phase change caused by a natural phenomenon or a physical phenomenon and a "meaningless" subtle phase change derived from noise mixed in an imaging process like the random noise mixed in the image due to, for example, thermal noise of the image sensor as in Equation (3) below.

The noise mixed in the imaging process is, for example, thermal noise, camera shake, ground vibration, or the like.

[Math. 3]

$$C^n(x,y,t,\theta)=\hat{C}^n(x,y,t,\theta)+\tilde{C}^n(x,y,t,\theta) \quad (3)$$

In Equation (3), "$\hat{C}^n(x, y, t, \theta)$" indicates a "meaningful" subtle phase change, and "$\tilde{C}^n(X, y, t, \theta)$" indicates a "meaningless" subtle phase change.

The reliability estimation unit 5 uses the amplitude change obtained by the decomposition conversion unit 3 to estimate the reliability of the subtle phase change "$C^n(x, y, t, \theta)$". First, the amplitude change "$A^n(x, y, t, \theta)$" in a certain resolution n and a certain direction θ is integrated over multiple resolutions as in Equation (4) below in order to consider a difference in the resolution of the amplitude change.

[Math. 4]

$$\hat{A}^n(x, y, t, \theta) = \max_{-N_n \leq i \leq N_n} (Z(A^n(x, y, t, \theta)), res(Z(A^{n+i}(x, y, t, \theta)), n)) \quad (4)$$

In Equation (4), "$N_n$" determines how many resolutions are to be used for this integration. Further, "$Z(A)$" is a function for representing a z-transform for transforming a parameter "A" into a z-score. By using this function, it becomes possible to standardize and compare amplitude changes of different scales among multiple resolutions. "$res(A^{(n+1)},n)$" is a function for resizing the amplitude change at resolution "n+i" (i is an integer equal to or greater than 1) to the resolution "n". A scheme regarding the standardization used in Z(A) or resizing used in "$res(A^{(n+1)},n)$" is not limited thereto.

The reliability estimation unit 5 uses a result of Equation (4) in which the amplitude changes of multiple resolutions have been integrated to estimate the reliability of the subtle phase change that has a greater value when the amplitude change becomes larger, as in Equation (5) below.

[Math. 5]

$$HEAR_\sigma^n(x,y,t,\theta)=\text{Norm}(G_\sigma \otimes \hat{A}^n(x,y,t,\theta)) \quad (5)$$

In Equation (5), "$HEAR_\sigma^n(x, y, t, \theta)$" indicates the reliability of the subtle phase change, "$G_\sigma$" is a function for spatially smoothing "$\hat{A}^n(x, y, t, \theta)$", and the parameter "σ" is a parameter indicating the strength of smoothing. Further, "Norm(X)" indicates that a value of the argument "X" is normalized to a range from 0 to 1. A method of spatially smoothing the parameter "$G_\sigma$" and a method of normalization are not limited to specific methods. The reliability "$HEAR_\sigma^n(x, y, t, \theta)$" indicates reliability of the subtle phase change in a region including the coordinates (x, y) in a range from 0 to 1. The reliability of the subtle phase change becomes higher when the value becomes greater.

The multiplication unit 6 multiplies the subtle phase change information by the reliability estimated by the reliability estimation unit 5 for each pixel or region. More specifically, the multiplication unit 6 multiplies the reliability "$HEAR_\sigma^n(x, y, t, \theta)$" described in Equation (5) by "$C^n(x, y, t)$" described in Equation 2, as in Equation (6) below.

[Math. 6]

$$\hat{C}^n(x,y,t,\theta)=HEAR_\sigma^n(x,y,t,\theta) \cdot C^n(x,y,t,\theta) \quad (6)$$

According to Equation (6), the subtle phase change "$\hat{C}^n(x, y, t)$" that occurs in the pixel value of the image due to the physical phenomenon other than the random noise is detected with high accuracy.

The change amount adjustment unit 7 multiplies the subtle phase change "$\hat{C}^n(x, y, t)$" obtained using Equation (6) by the predetermined adjustment rate (emphasis rate) "α". That is, the change amount adjustment unit 7 multiplies the subtle phase change "$\hat{C}^n(x, y, t)$" derived with high accuracy in Equation (6) by the predetermined adjustment rate (emphasis rate) "α" as in Equation (7) below. The change amount adjustment unit 7 adds the original phase change "$\phi^n(x, y, t, \theta)$" to a result of the multiplication to derive the phase change "$\hat{\phi}^n(x, y, t, \theta)$" in which the amount of change in the gentle and subtle phase change has been adjusted (for example, emphasized or attenuated), as in Equation (7).

[Math. 7]

$$\hat{\phi}^n(x,y,t,\theta)=\phi^n(x,y,t,\theta)+\alpha \cdot \hat{C}^n(x,y,t,\theta) \quad (7)$$

By doing this, the change amount adjustment unit 7 adjusts the amount of change in the detected subtle phase change. The adjustment rate may be the same or different for each resolution, direction, time, or position.

When the subtle phase change is emphasized, the predetermined adjustment rate "α" is a positive value larger than 0. When the subtle phase change is attenuated, the predetermined adjustment rate "α" is a negative value smaller than 0. An upper limit value and a lower limit value of "α" may not be specifically determined. However, for example, when the subtle phase change is attenuated, a value of the predetermined adjustment rate "α" in a case in which a value of the original phase change "$\phi^n(x, y, t)$" becomes 0 is set as the lower limit value of "α". When "α" is set to 0, the subtle phase change is not adjusted.

The image reconstruction unit 8 solves Equation (7) for each resolution and direction. The image reconstruction unit 8 applies the inverse filter of the CSF to the adjusted phase change "$\hat{\phi}^n(x, y, t, \theta)$" obtained for each resolution and direction to perform conversion to luminance information in which the subtle motion change has been emphasized. Thereafter, it is possible to obtain a final video output through addition to a color video.

The image reconstruction unit 8 (image combination unit) reconstructs the image. The image reconstruction unit 8 acquires the multiple adjusted luminance images having mutually different resolutions from the change amount adjustment unit 7. The image reconstruction unit 8 reconstructs the original resolution luminance image by combining the multiple adjusted luminance images having mutually different resolutions. Specifically, the image reconstruction unit 8 performs conversion to the multiple adjusted luminance images having mutually different resolutions and the luminance information in which the subtle motion change has been emphasized by applying the inverse filter of the complex steerable filter (CSF) for each direction, and combination to reconstruct the original resolution luminance image.

The image reconstruction unit 8 acquires the original resolution color image from the image input unit 2. The image reconstruction unit 8 combines the reconstructed original resolution luminance image and the original resolution color image. The image reconstruction unit 8 outputs an image finally adjusted by using the video magnification to a predetermined external device, as the combination result.

Figure 2:
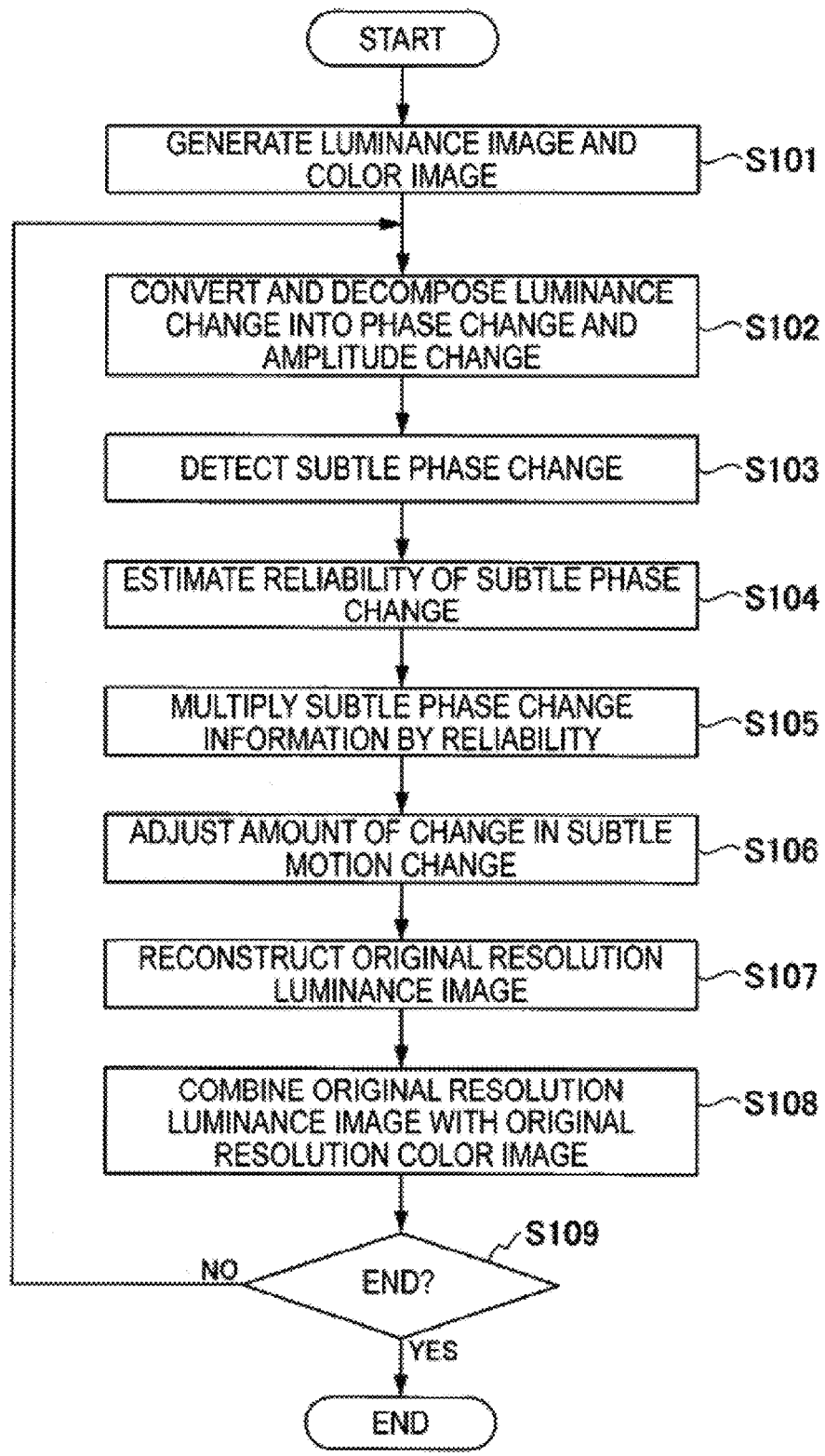
FIG. 2 is a flowchart illustrating an operation example of the image processing apparatus in the first embodiment.

Next, an operation example of the image processing apparatus 1 will be described. FIG. 2 is a flowchart illustrating an operation example of the image processing apparatus 1 according to the first embodiment. The image input unit 2 generates the luminance images and the color images from the multiple frames of the moving image (step S101). The image input unit 2 outputs an original resolution luminance image to the decomposition conversion unit 3. The image input unit 2 outputs an original resolution color image to the image reconstruction unit 8. The decomposition conversion unit 3 converts the luminance change to a phase conversion and an amplitude change based on the original resolution luminance image output from the image input unit 2, and decomposes the luminance image into multiple resolutions (step S102). The decomposition conversion unit 3 outputs the phase change information of each resolution to the change detection unit 4. The decomposition conversion unit 3 outputs the amplitude change information of each resolution to the reliability estimation unit 5.

The change detection unit 4 detects a subtle change in the luminance in the luminance image having each resolution based on the phase change information output from the decomposition conversion unit 3 (step S103). The change detection unit 4 outputs subtle phase change information of each resolution to the multiplication unit 6.

The reliability estimation unit 5 estimates the reliability "$HEAR_\sigma''(x, y, t, \theta)$" of the subtle phase change "$C''(x, y, t)$" based on the amplitude change information output from the decomposition conversion unit 3 (step S104). The reliability estimation unit 5 outputs the estimated reliability "$HEAR_\sigma''(x, y, t, \theta)$" to the multiplication unit 6.

The multiplication unit 6 multiplies the subtle phase change information output from the change detection unit 4 by the reliability "$HEAR_\sigma''(x, y, t, \theta)$" output from the reliability estimation unit 5 (step S105). The multiplication unit 6 outputs a multiplication result to the change amount adjustment unit 7. The change amount adjustment unit 7 uses the multiplication result output from the multiplication unit 6 to adjust the amount of change in the subtle motion change multiplied by the reliability through emphasis or attenuation (step S106). The change amount adjustment unit 7 outputs information on the amount of change in the motion change to the image reconstruction unit 8. The image reconstruction unit 8 reconstructs the original resolution luminance image based on the multiple adjusted luminance images having mutually different resolutions (step S107). The image reconstruction unit 8 combines the reconstructed original resolution luminance image and the original resolution color image (step S108).

The decomposition conversion unit 3 determines whether the image processing apparatus 1 ends the processing based on, for example, an instruction obtained from the user (step S109). When the image processing apparatus 1 continues the processing (step S109: NO), each functional unit of the image processing apparatus 1 returns the processing to step S102. When the image processing apparatus 1 ends the processing (step S109: YES), each functional unit of the image processing apparatus 1 ends the processing.

As described above, the image processing apparatus 1 of the first embodiment includes the change detection unit 4 and the reliability estimation unit 5. The change detection unit 4 detects a predetermined amount of change in a phase change among the phase changes in the luminance image having multiple resolutions. The reliability estimation unit 5 estimates the reliability "$HEAR_\sigma''(x, y, t, \theta)$" of the detected phase change.

This makes it possible for the image processing apparatus 1 to detect a "meaningful" subtle phase change among the detected subtle changes in the video more accurately. Thus, the image processing apparatus 1 can adjust the amount of change in the "meaningful" subtle phase change. Thus, the image processing apparatus 1 can reduce the adjustment of the random noise mixed in the moving image when adjusting the amount of change in the subtle motion change of the moving image.

Second Embodiment

A second embodiment differs from the first embodiment in that an image processing apparatus reduces the adjustment of the random noise mixed in the moving image using the reliability obtained in the first embodiment and reliability obtained based on a temporal behavior of the subtle phase change. Differences between the second embodiment and the first embodiment will be described.

Figure 3:
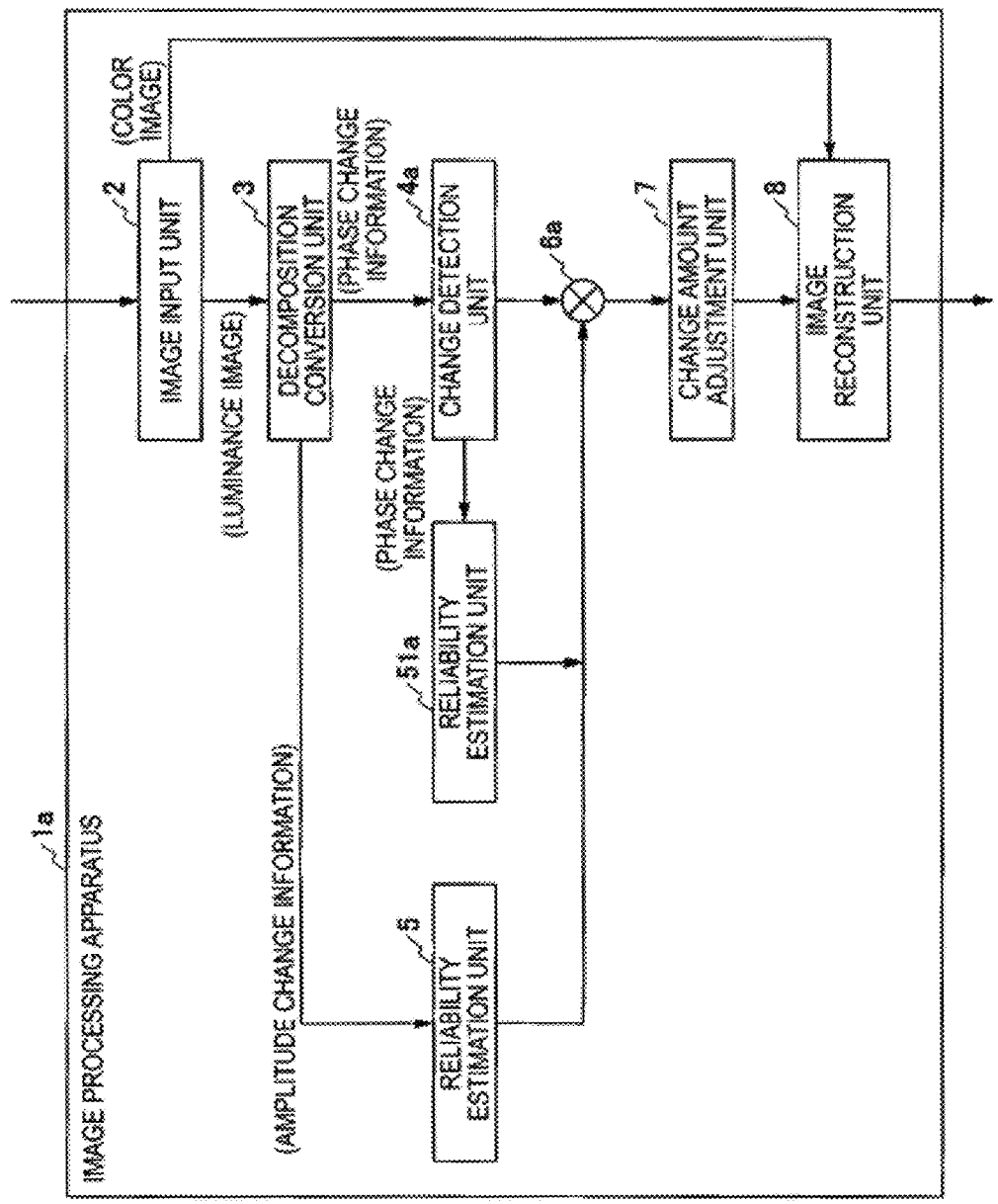
FIG. 3 is a diagram illustrating a configuration example of an image processing apparatus in a second embodiment.

FIG. 3 is a diagram illustrating a configuration example of the image processing apparatus 1a according to the second embodiment. The image processing apparatus 1a is an apparatus that executes a predetermined image processing on a moving image. The image processing apparatus 1a includes an image input unit 2, a decomposition conversion unit 3, a change detection unit 4a, a reliability estimation unit 5, a multiplication unit 6a, a change amount adjustment unit 7, an image reconstruction unit 8, and a reliability estimation unit 51a. Each functional unit may be combined and provided as a single functional unit, or may be divided and provided as multiple functional units.

In the second embodiment, the image processing apparatus 1a executes first reliability estimation processing and second reliability estimation processing. That is, the image processing apparatus 1a executes the first reliability estimation processing on the moving image, and further executes the second reliability estimation processing on the moving image. An execution order of the first reliability estimation processing and the second reliability estimation processing may be reversed. The first reliability estimation processing is executed by the reliability estimation unit 5. On the other hand, the first reliability estimation processing is executed by the reliability estimation unit 51a.

In the first reliability estimation processing, each functional unit of the image processing apparatus 1a executes the same processing as each functional unit of the image processing apparatus 1 of the first embodiment. That is, the image processing apparatus 1a executes the first reliability estimation processing using the reliability estimation unit 5. A method of estimating the reliability in the first reliability estimation processing is the same as that of the first embodiment. Hereinafter, the reliability estimated by the reliability estimation unit 5 is referred to as a first reliability.

The second reliability estimation processing will be described below. Hereinafter, the reliability estimated by the reliability estimation unit 51a is referred to as a second reliability.

Figure 4:
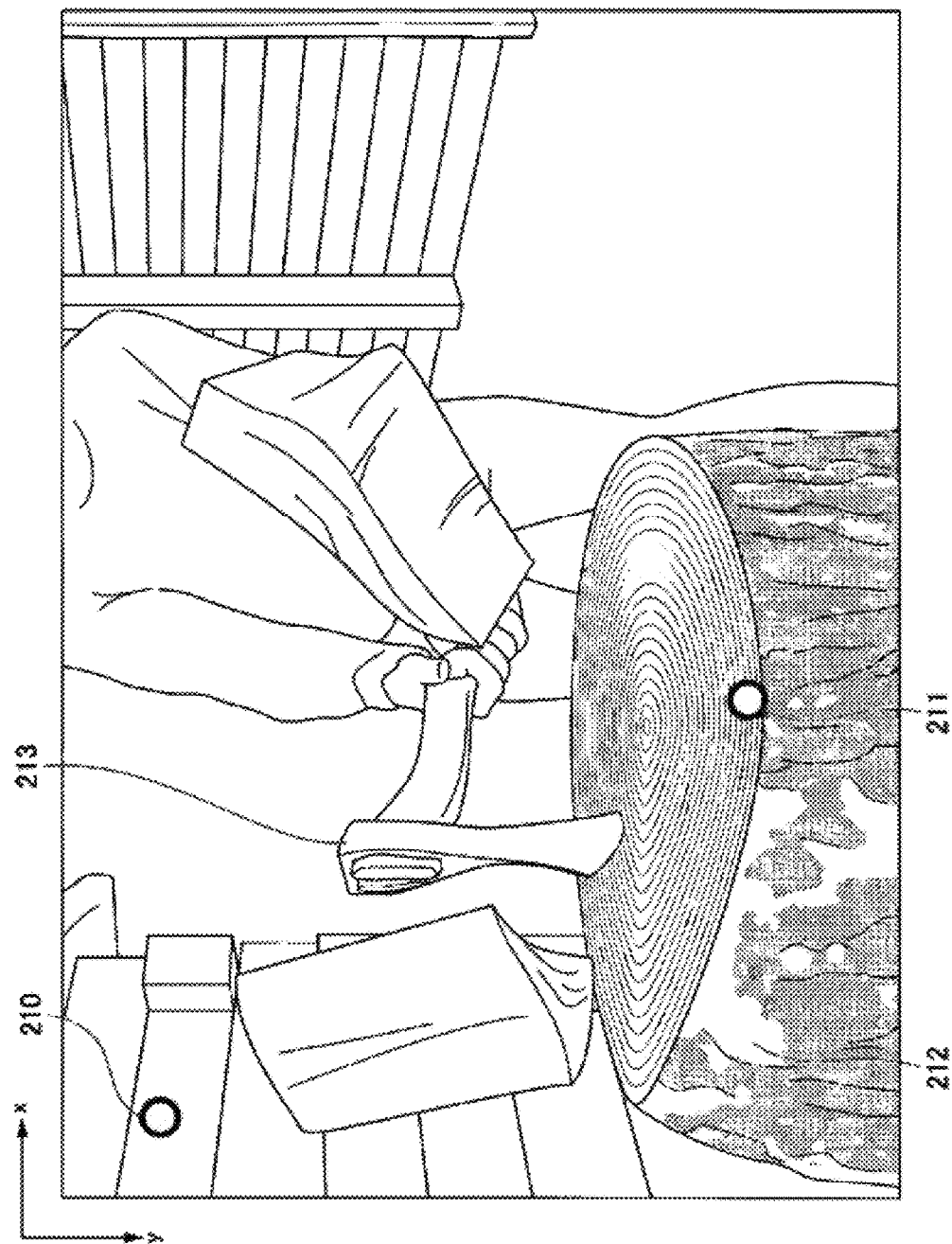
FIG. 4 is a diagram illustrating an example of pixels in a frame of a moving image in the second embodiment.

FIG. 4 is a diagram illustrating an example of pixels in a frame of a moving image. Hereinafter, an x-coordinate in a horizontal direction and a y-coordinate in a vertical direction are determined in the frame of the moving image. In the frame illustrated in FIG. 4, an operation of an ax being lowered onto a stump (an operation of chopping wood) is imaged. The frame illustrated in FIG. 4 includes a pixel 210, a pixel 211, a stump image 212, and an ax image 213. The pixel 210 is a pixel included in an image of a wall captured in a first partial region of a frame. The pixel 211 is a pixel included in the stump image 212 captured in a second partial region of the frame.

Figure 5:
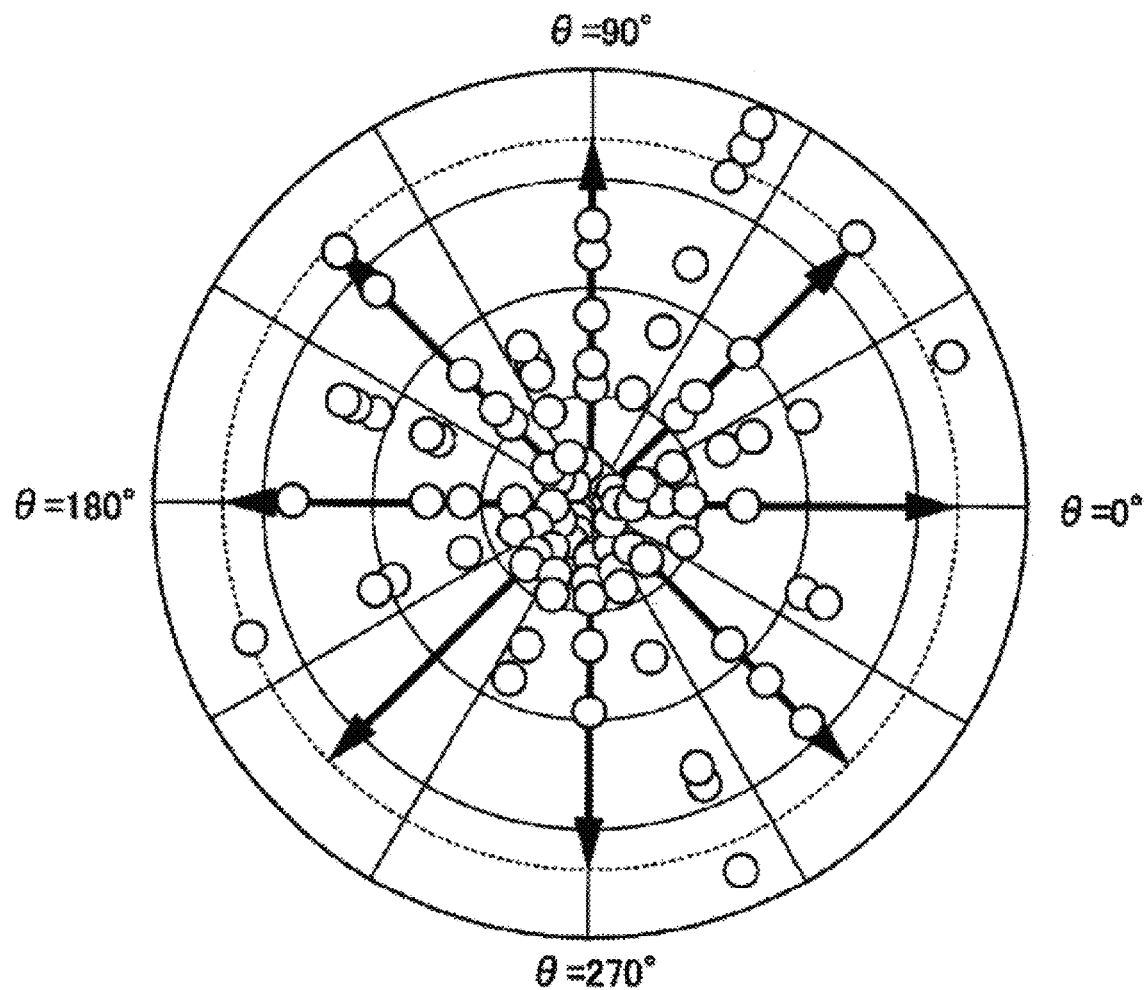
FIG. 5 is a diagram illustrating isotropic diffusion of subtle phase change in the second embodiment.

FIG. 5 is a diagram illustrating isotropic diffusion of the subtle phase change. The subtle phase change illustrated in FIG. 5 is a subtle phase change in luminance information of the pixel 210. A distance from an origin of a graph illustrated in FIG. 5 indicates an amount of change in a phase change of the luminance information of the pixel 210. In FIG. 5, a predetermined spatial direction "θ" is, for example, an angle (0.0°, 22.5°, 45.0°, 67.5°, 90.0°, . . . ) at an interval of 22.5°.

The meaningless subtle phase change is isotropic diffusion, as in the example illustrated in FIG. 5. The amount of change in the phase change changes, for example, as in "0.2" in a direction of "θ=90 degrees" at time t1 and "0.2" in a direction of "θ=67.5 degrees" at time t2.

Figure 6:
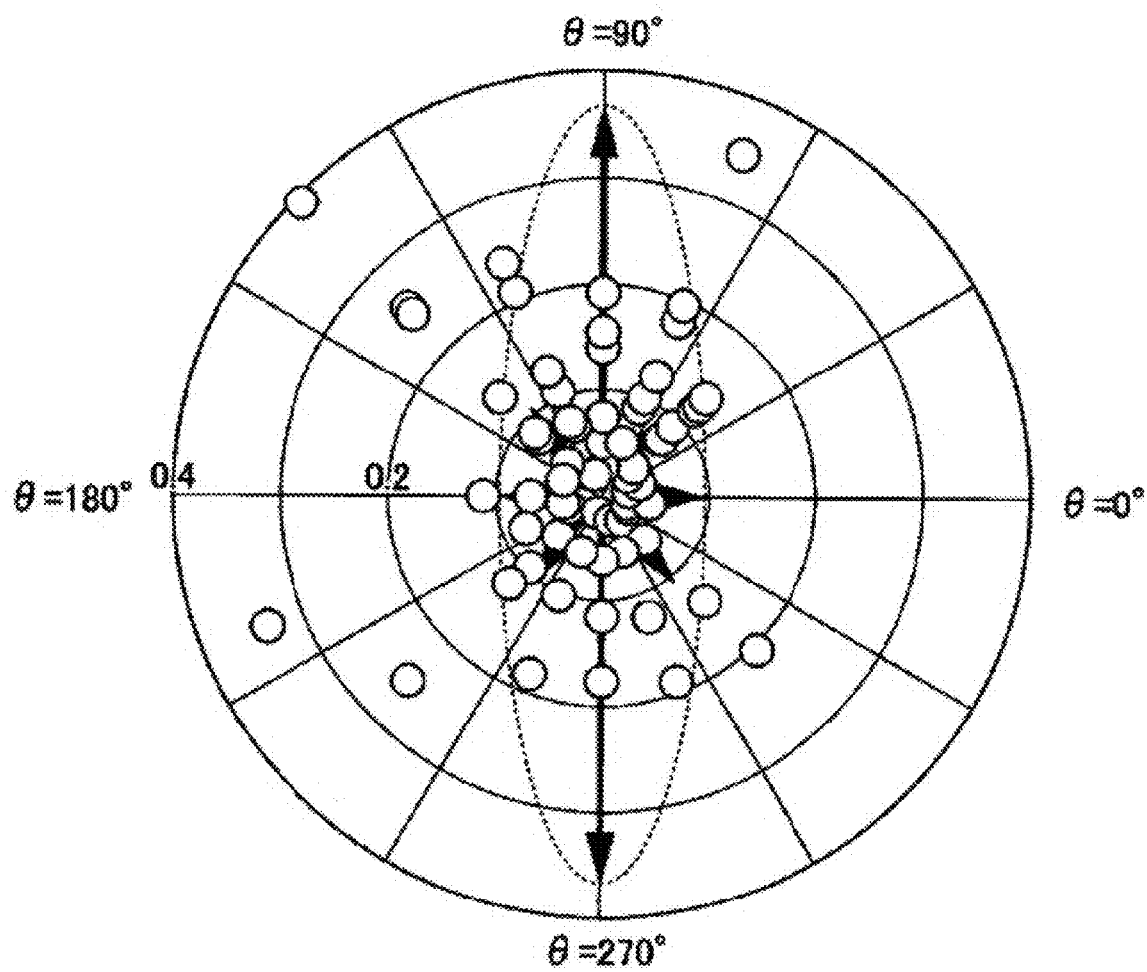
FIG. 6 is a diagram illustrating anisotropic diffusion of subtle phase change in the second embodiment.

FIG. 6 is a diagram illustrating anisotropic diffusion of the subtle phase change. The subtle phase change illustrated in FIG. 6 is a subtle phase change in the luminance information of the pixel 211. A distance from an origin of a graph illustrated in FIG. 6 indicates an amount of change in a phase change of the luminance information of the pixel 211. In FIG. 6, a predetermined spatial direction "θ" is, for example, an angle (0.0°, 22.5°, 45.0°, 67.5°, 90.0°, . . . ) at an interval of 22.5°.

In a time zone "(−)t" including time t, a meaningful subtle phase change occurs in a spatial direction of a small number of axes among multiple axes in the spatial direction. In FIG. 6, a variance is large with respect to an axis (y-axis) of, for example, "θ=90°" among "θ" in the spatial direction. The meaningful subtle phase change is anisotropic diffusion, as in the example illustrated in FIG. 6. The amount of change in the meaningful subtle phase change changes so that the time distribution is biased in a specific direction.

In a meaningful motion, spatial directions θ of the phase changes are close to each other at a specific time within a unit time. For example, in a vibration in a vertical direction of the stump colliding with the ax, the spatial directions θ of the phase changes become, for example, 90 degrees at specific times (t1, t2, . . . ) according to a vibration period.

Referring back to FIG. 3, a configuration for executing the second reliability estimation processing will be described hereinafter. The change detection unit 4a receives the phase change information. The change detection unit 4a detects a subtle phase change "C″(x, y, t, θ)" in the luminance image having each resolution based on the received phase change information. The change detection unit 4a outputs subtle phase change information, which is information indicating the detected subtle phase change in the luminance image, to the reliability estimation unit 51a and the multiplication unit 6a for each resolution.

The reliability estimation unit 51a receives the subtle phase change information. The reliability estimation unit 51a estimates the reliability (second reliability) of the subtle phase change "C″(x, y, t, θ)" based on the received subtle phase change information. The reliability estimation unit 51a estimates the second reliability so that the reliability of the subtle phase change occurring in the pixel value of the image due to the random noise mixed in the image due to, for example, thermal noise of the image sensor is lower than the reliability of the subtle phase change occurring in the pixel value of the image due to the physical phenomenon other than the random noise. The reliability estimation unit 51a outputs the second estimated reliability to the multiplication unit 6a. The second reliability has a greater value when the temporal behavior of the subtle phase change "C″(x, y, t, θ)" indicates higher correlation between neighboring regions. That is, the second reliability has a greater value as the time distribution of the subtle phase change indicates more anisotropic. In other words, the second reliability has a greater value as the diffusion result indicates more anisotropic.

The multiplication unit 6a receives the subtle phase change information, the first reliability, and the second reliability. The multiplication unit 6a multiplies the received subtle phase change information by the first reliability and the second reliability for each pixel, and outputs a result of the multiplication (multiplication result) to the change amount adjustment unit 7. The multiplication unit 6a may perform weighted multiplication or weighted addition of the first reliability and second reliability that have been received. For example, the multiplication unit 6a sets a weight of the reliability that is important in processing among the first reliability and the second reliability to be larger than a weight of the other reliability, and performs weighted multiplication or weighted addition through weighting of values of the first reliability and the second reliability. When the multiplication unit 6a multiplies the subtle phase change information by the first reliability and the second reliability, the subtle phase change "^C″(x, y, t, θ)" occurring in the pixel value of the image due to the physical phenomenon other than the random noise is detected with high accuracy.

Next, details of the image processing apparatus 1a (details of a configuration for estimating the second reliability) will be described. The image input unit 2 acquires multiple frames of the moving image as the image processing target. The image input unit 2 generates, an original resolution luminance image "I(x, y, t)" and an original resolution color image from the multiple acquired frames. "x" represents an x-coordinate in the frame of the moving image (such as the luminance image or the like). "y" represents a y-coordinate in the frame of the moving image (such as the luminance image). "t" represents a time of a frame of a temporal moving image. The image input unit 2 outputs the original resolution luminance image "I(x, y, t)" to the decomposition conversion unit 3. The image input unit 2 outputs an original resolution color image to the image reconstruction unit 8.

The decomposition conversion unit 3 uses a CSF for a luminance change "I(x, y, t)" of a video at a certain place (x, y) and a certain time t of the received original resolution luminance image to convert and decompose the luminance change "I(x, y, t)" of the video into an amplitude change "A″(x, y, t, θ)" and a phase change "φ″(x, y, t, θ)" in a certain resolution "n" and a certain direction "θ", as in Equation (1) above. The parameter "n" indicates the resolution. In the present embodiment, the configuration using the CSF is described, but the filter is not limited thereto. However, in the following embodiment, a case in which the CSF is used will be described.

The change detection unit 4a detects subtle change in luminance in the generated luminance image having each resolution. The change detection unit 4a convolves a temporal filter "H(t)" having a frequency response with a subtle change to be emphasized with respect to the phase change "φ″(x, y, t, θ)" for each direction in the video having each resolution obtained in the decomposition conversion unit 3 or multiplies the phase change by the spatiotemporal filter "J(x, y, t)" for removing large change to detect the subtle phase change "C″(x, y, t, θ)" as in Equation (2) above. The change detection unit 4a may not multiply the phase change by the spatiotemporal filter "J(x, y, t)". That is, when the change detection unit 4a detects the subtle phase change "C″(x, y, t, θ)", the change detection unit 4a may not use the spatiotemporal filter "J(x, y, t)".

The subtle phase change "C″(x, y, t, θ)" obtained by the change detection unit 4a includes a "meaningful" subtle phase change caused by a natural phenomenon or a physical phenomenon and a "meaningless" subtle phase change derived from noise mixed in an imaging process like the random noise mixed in the image due to, for example, thermal noise of the image sensor as in Equation (3) above. The noise mixed in the imaging process is, for example, thermal noise, camera shake, ground vibration, or the like.

The reliability estimation unit 51a uses the subtle phase change "C"(x, y, t, θ)" obtained by the change detection unit 4a to estimate the reliability (second reliability) of the subtle phase change "C"(x, y, t, θ)". Specifically, the reliability estimation unit 51a evaluates a temporal behavior (time distribution) of the subtle phase change "C"(x, y, t, θ)" obtained by the change detection unit 4a to estimate the reliability of the subtle phase change. Considering a video region $(-)X \in R^{(h \times w)} = R^d$ around a certain place (x, y) and a time width "(-)t" around a certain time t with respect to the subtle phase change "C"(x, y, t, θ)" output from the change detection unit 4, a diffusion equation regarding the subtle phase change "C"(x, y, t, θ)" can be formulated as in Equation (8) below while noting that the phase change depends on the direction θ.

[Math. 8]

$$f(C^n(x, \tau, \theta)) = \frac{1}{(2\pi)^{d/2}|D|^{1/2}} \exp\left(-\frac{1}{2}C^n(\theta)^T D^{-1} C^n(\theta)\right) \quad (8)$$

In Equation (8), "f(C"((-)x, (-)t, θ))" indicates the time distribution of the subtle phase change, and "D" indicates a diffusion tensor matrix in a time width "(-)t". Assuming that similar phase changes occur within the time width "(-)t" in a video region "(-)x", and if these changes can be summarized as a spatiotemporal data sample "s", Equation (8) can be changed as in Equation (9) below.

[Math. 9]

$$f(C^n(\theta, s)) = \frac{1}{(2\pi)^{d/2}|D|^{1/2}} \exp\left(-\frac{1}{2}C^n(\theta)^T D^{-1} C^n(\theta)\right) \quad (9)$$

From Equation (9) above, the diffusion tensor matrix can be obtained to be in Equation (10) below.

[Math. 10]

$$D = cov(C^n(\theta, s)) \quad (10)$$

In Equation (10), "cov(X)" means that a variance-covariance matrix of an X matrix is calculated. Thereafter, the reliability estimation unit 51a performs eigendecomposition on "D" to obtain a fractional anisotropy (hereinafter referred to as an "FA"), which is a feature quantity regarding the time distribution of the subtle phase change, from Equation (11) below.

[Math. 11]

$$FA^n(x, y, t) := \sqrt{\frac{d}{d-1}} \cdot \frac{\sqrt{\sum_{i=1}^{n}(\lambda_i - \lambda)^2}}{\sqrt{\sum_{i=1}^{n} \lambda_i^2}} \quad (11)$$

In Equation (11), $(\lambda_1, \ldots, \lambda_d)$ is an eigenvalue of "D", and "(-)λ" is an average thereof. "FA" is a feature quantity having "1" when the time distribution indicates anisotropy and "0" when the time distribution indicates isotropy. The "meaningful" subtle phase change caused by a natural phenomenon or physical phenomenon has a biased time distribution in a specific direction and has high anisotropy. Thus, the "meaningful" subtle phase change indicates an FA value close to "1". On the other hand, the "meaningless" subtle phase change derived from noise mixed during the imaging process has a time distribution diffused in random directions, has low anisotropy, and has high isotropy. Thus, the "meaningless" subtle phase change has an FA value close to "0". Thus, the reliability estimation unit 51a estimates the reliability of the subtle phase change based on Equation (12) below using the FA.

[Math. 12]

$$FAF_{\sigma,\gamma}{}^n(x,y,t) = (Norm(G_\sigma \otimes FA^n(x,y,t)))^\gamma \quad (12)$$

In Equation (12), "$FAF_{\sigma,\gamma}{}^n$(x, y, t)" is the spatiotemporal filter indicating the reliability of the subtle phase change, "$G_\sigma$" is a function for spatially smoothing "$FAF_{\sigma,\gamma}{}^n$(x, y, t)", and the parameter "σ" is a parameter indicating the strength of smoothing. Further, "Norm(X)" indicates that a value of the argument "X" is normalized to a range from 0 to 1. A method of spatially smoothing the parameter "$G_\sigma$" and a method of normalization are not limited to specific methods. The reliability "$FAF_{\sigma,\gamma}{}^n$(x, y, t)" indicates reliability of the subtle phase change in a region including the coordinates (x, y) in a range from 0 to 1. The reliability of the subtle phase change becomes higher when the value becomes greater.

The multiplication unit 6a multiplies the subtle phase change information by the first reliability estimated by the reliability estimation unit 5 and the second reliability estimated by the reliability estimation unit 51a for each pixel. More specifically, the multiplication unit 6a multiplies the reliability "$FAF_{\sigma,\gamma}{}^n$(x, y, t)" described in Equation (12) by "C"(x, y, t)" described in Equation (2), as in Equation (13) below.

[Math. 13]

$$\hat{C}^n(x,y,t,\theta) = FAF_{\sigma,\gamma}{}^n(x,y,t) \cdot C^n(x,y,t,\theta) \quad (13)$$

According to equation (13), the small phase change "^C"(x, y, t)" generated in the pixel values of the image due to physical phenomena other than random noise are detected with high accuracy.

The change amount adjustment unit 7 multiplies the subtle phase change "^C"(x, y, t)" obtained using Equation (13) by the predetermined adjustment rate (emphasis rate) "α". That is, the change amount adjustment unit 7 multiplies the subtle phase change "^C"(x, y, t)" derived with high accuracy as in Equation (13) by the predetermined adjustment rate (emphasis rate) "α" as in Equation (14) below. The change amount adjustment unit 7 adds an original phase change "φ"(x, y, t, θ)" to the multiplication result to derive a phase change "^φ"(x, y, t, θ)" in which the amount of change in the gentle and subtle phase change has been adjusted (for example, emphasized or attenuated), as in Equation (14).

[Math. 14]

$$\hat{\phi}^n(x,y,t,\theta) = \phi^n(x,y,t,\theta) + \alpha \cdot \hat{C}^n(x,y,t,\theta) \quad (14)$$

By doing this, the change amount adjustment unit 7 adjusts the amount of change in the detected subtle phase change. The adjustment rate may be the same or different for each resolution, direction, time, or position.

When the subtle phase change is emphasized, the predetermined adjustment rate "α" is a positive value larger than 0. When the subtle phase change is attenuated, the predetermined adjustment rate "α" is a negative value smaller than 0. An upper limit value and a lower limit value of "α" may not be specifically determined. However, for example, when the subtle phase change is attenuated, a value of the predetermined adjustment rate "α" in a case in which a value of the original phase change "ϕ″(x, y, t)" becomes 0 is set as the lower limit value of "α". When "α" is set to 0, the subtle phase change is not adjusted.

The image reconstruction unit 8 solves Equation (13) for each resolution and direction. The image reconstruction unit 8 applies the inverse filter of the CSF to the adjusted phase change "ϕ″(x, y, t, θ)" obtained for each resolution and direction to perform conversion to luminance information in which the subtle motion change has been emphasized. Thereafter, it is possible to obtain a final video output through addition to a color video.

The image reconstruction unit 8 (image combination unit) reconstructs the image. The image reconstruction unit 8 acquires the multiple adjusted luminance images having mutually different resolutions from the change amount adjustment unit 7. The image reconstruction unit 8 reconstructs the original resolution luminance image by combining the multiple adjusted luminance images having mutually different resolutions.

The image reconstruction unit 8 acquires the original resolution color image from the image input unit 2. The image reconstruction unit 8 combines the reconstructed original resolution luminance image and the original resolution color image. The image reconstruction unit 8 outputs an image finally adjusted by using the video magnification to a predetermined external device, as the combination result.

Figure 7:
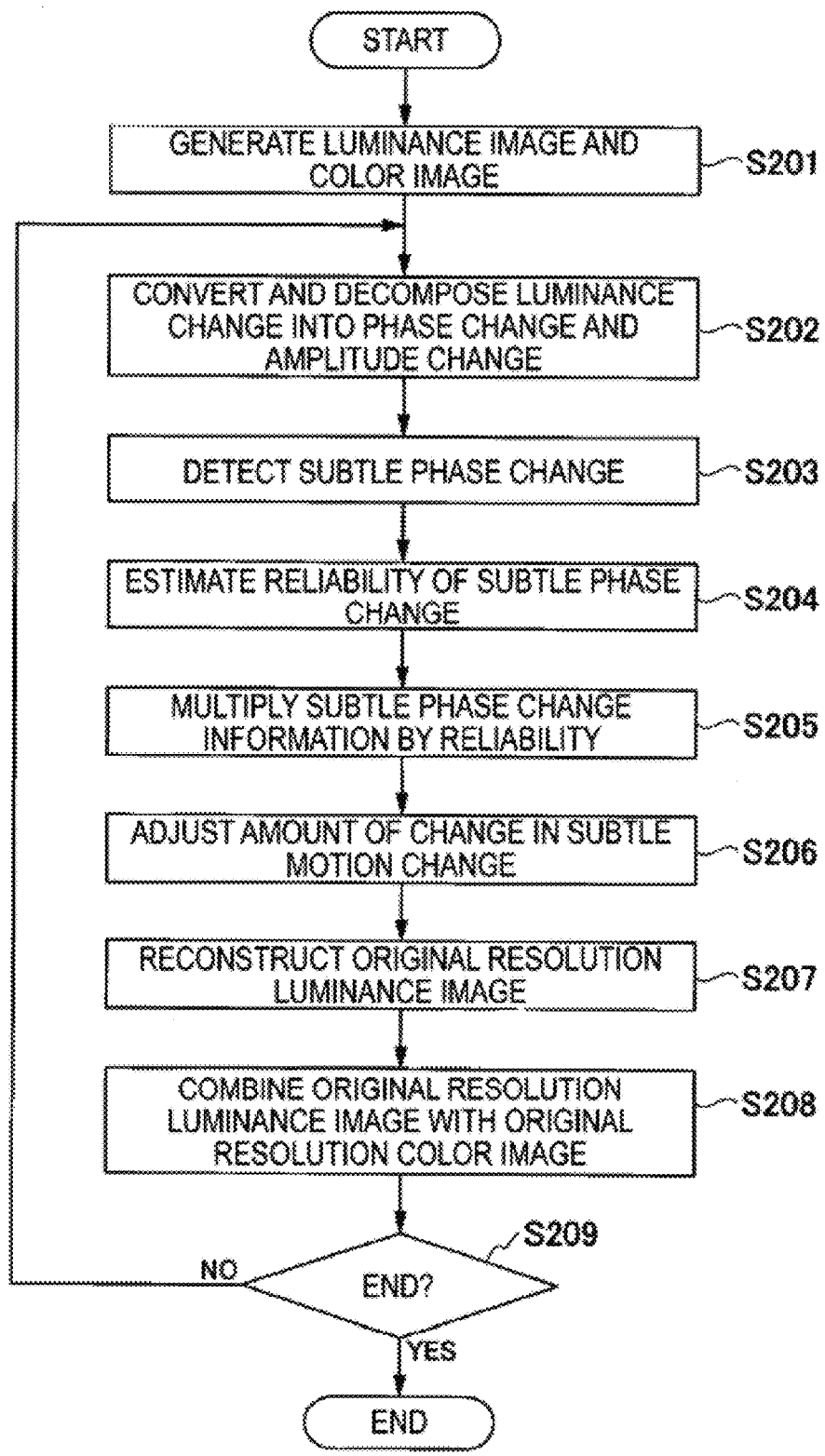
FIG. 7 is a flowchart illustrating an operation example of the image processing apparatus in the second embodiment.

Next, an operation example of the image processing apparatus 1a will be described. FIG. 7 is a flowchart illustrating an operation example of the image processing apparatus 1a according to the second embodiment. In processing of FIG. 7, description of the first reliability estimation processing will be omitted. The image input unit 2 generates the luminance images and the color images from the multiple frames of the moving image (step S201). The image input unit 2 outputs an original resolution luminance image to the decomposition conversion unit 3. The image input unit 2 outputs an original resolution color image to the image reconstruction unit 8. The decomposition conversion unit 3 converts the luminance change to a phase conversion and an amplitude change based on the original resolution luminance image output from the image input unit 2, and decomposes the luminance image into multiple resolutions (step S202). The decomposition conversion unit 3 outputs the phase change information of each resolution to the change detection unit 4a.

The change detection unit 4a detects a subtle change in the luminance in the luminance image having each resolution based on the phase change information output from the decomposition conversion unit 3 (step S203). The change detection unit 4a outputs subtle phase change information of each resolution to the multiplication unit 6.

The reliability estimation unit 51a estimates the reliability (second reliability) "FAF$_{o,\gamma}$″(x, y, t)" of the subtle phase change "C″(x, y, t)" based on the phase change information output from the change detection unit 4a (step S204). The reliability estimation unit 51a outputs the estimated reliability "FAF$_{o,\gamma}$″(x, y, t)" to the multiplication unit 6a.

The multiplication unit 6a multiplies the subtle phase change information output from the change detection unit 4a by the first reliability output from the reliability estimation unit 5 and the reliability "FAF$_{o,\gamma}$″(x, y, t)" output from the reliability estimation unit 51a (step S205). The multiplication unit 6a outputs a multiplication result to the change amount adjustment unit 7. The change amount adjustment unit 7 uses the multiplication result output from the multiplication unit 6a to adjust the amount of change in the subtle motion change multiplied by the reliability through emphasis or attenuation (step S206). The change amount adjustment unit 7 outputs information on the amount of change in the motion change to the image reconstruction unit 8. The image reconstruction unit 8 reconstructs the original resolution luminance image based on the multiple adjusted luminance images having mutually different resolutions (step S207). The image reconstruction unit 8 combines the reconstructed original resolution luminance image and the original resolution color image (step S208).

The decomposition conversion unit 3 determines whether the image processing apparatus 1a ends the processing based on, for example, an instruction obtained from the user (step S209). When the image processing apparatus 1a continues the processing (step S210: NO), each functional unit of the image processing apparatus 1a returns the processing to step S202. When the image processing apparatus 1a ends the processing (step S209: YES), each functional unit of the image processing apparatus 1a ends the processing.

Next, an example of a result of adjusting the amount of change in the motion change (phase change) of the image will be described.

Figure 8:
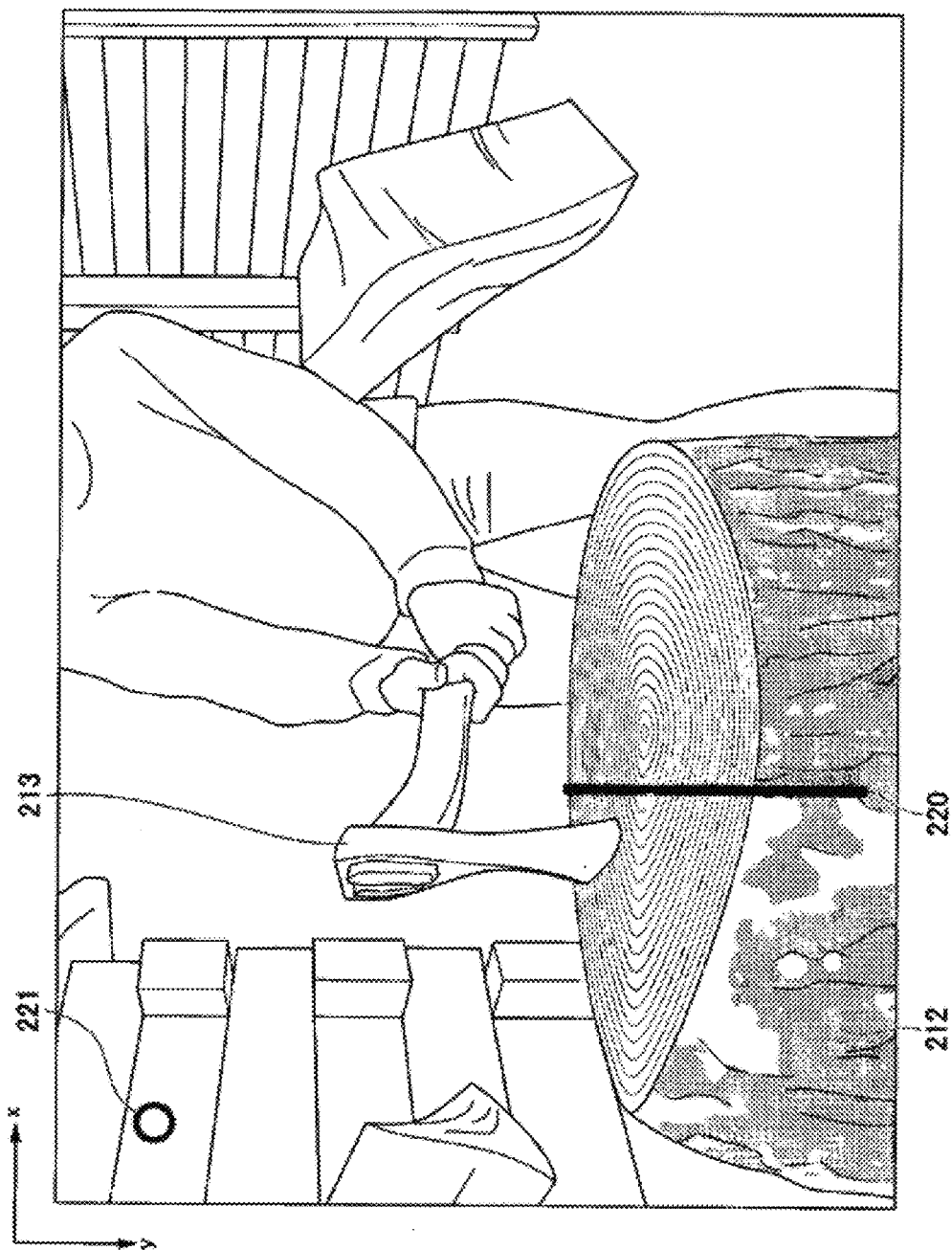
FIG. 8 is a diagram illustrating an example of a frame of a moving image in the second embodiment.

FIG. 8 is a diagram illustrating an example of a frame of a moving image. In the frame illustrated in FIG. 8, an operation of an ax being lowered onto a stump (an operation of chopping wood) is imaged. In the temporal frame after the time when the ax collides with the stump, the stump vibrates slightly in the y-axis direction.

The frame illustrated in FIG. 8 includes a pixel group 220 and pixel 221. The pixel group 220 consists of pixels arranged in a vertical direction (y-axis direction) in a stump image 212 captured in a first partial region in the frame. The pixel 221 is a pixel included in an image of a wall captured in a second partial region in the frame.

In the frame of the moving image, a subtle phase change in a random spatial direction normally occurs due to random noise in a pixel value of the pixel 221 of the image of the wall. When the ax is lowered toward the stump in the y-axis direction, a subtle phase change in the y-axis direction mainly occurs due to a vibration of the stump image 212 in the pixel value of the pixel group 220 of the stump image 212 because of the collision between the stump and the ax.

Figure 9:
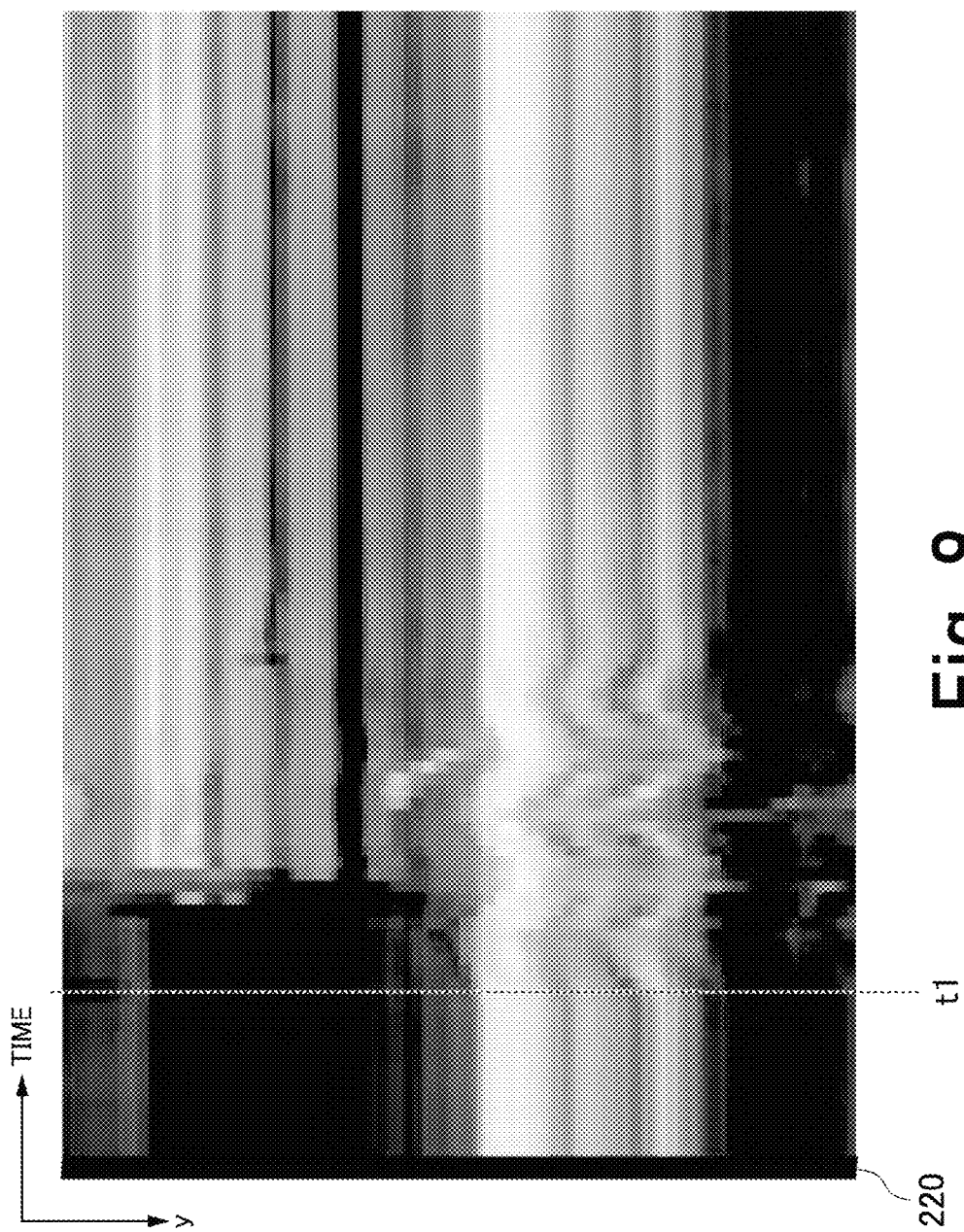
FIG. 9 is a diagram illustrating an example of pixel values of a pixel group in which an amount of change in a motion change has been adjusted based on a diffusion result of phase change in the second embodiment.

FIG. 9 is a diagram illustrating an example of pixel values of the pixel group 220 in which the amount of change in the motion change has been adjusted based on the diffusion result of the phase change. In FIG. 9, by the amount of change in the motion change being adjusted based on the diffusion result of the phase change, a portion to be emphasized is emphasized and noise is curbed. Thus, after time "t1" when the stump and the ax collide, an amount of change in a pixel value (motion change) of the portion to be emphasized is large.

Figure 10:
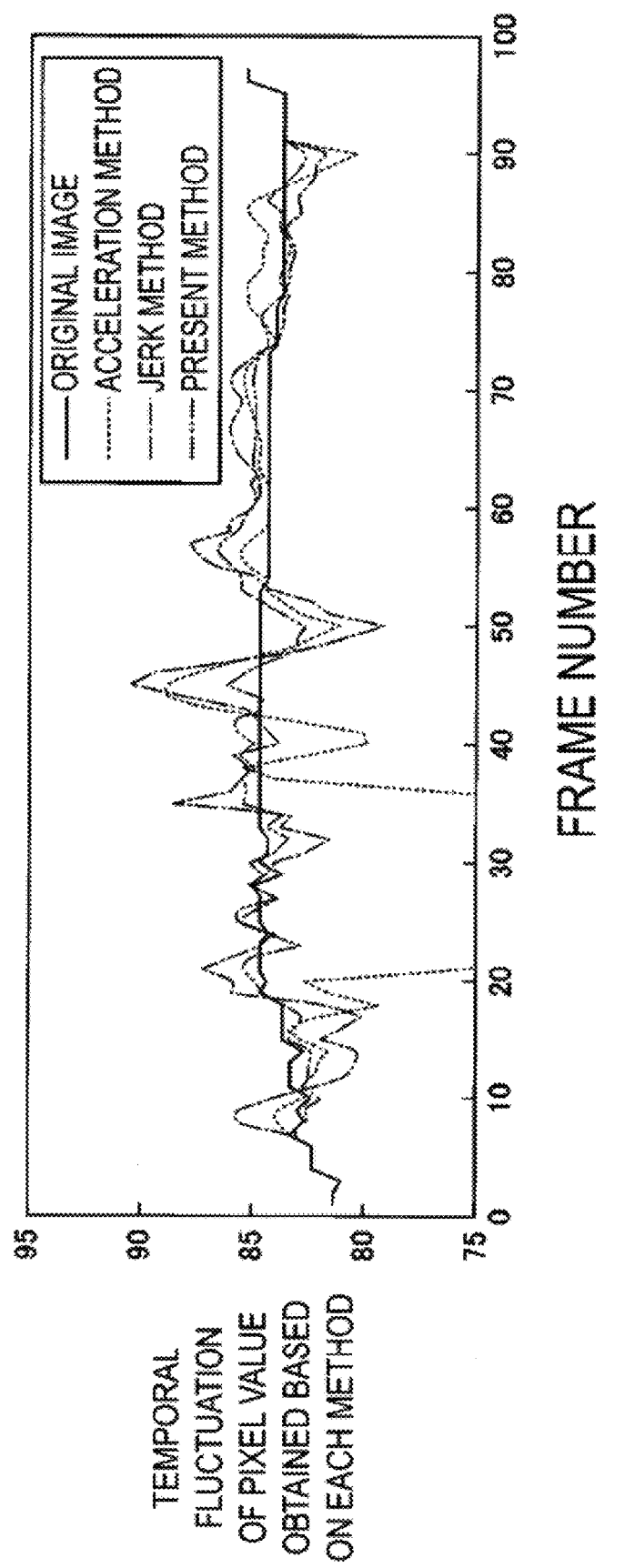
FIG. 10 is a diagram illustrating an example of a pixel value of a pixel of an original image in which an amount of change in a motion change has not been adjusted and a pixel value of a pixel of each image in which the amount of change in the motion change has been adjusted in the second embodiment.

FIG. 10 is a diagram illustrating an example of the pixel value of the pixel 221 of the original image in which the amount of change in the motion change has not been adjusted and the pixel value of the pixel 221 of each image in which the amount of change in the motion change has been adjusted. A horizontal axis indicates a frame number (time). A vertical axis indicates a temporal fluctuation of the pixel value obtained based on each method. Here, examples of each method may include an acceleration method, a jerk method, and the present method. As a comparison target with each of these methods, the temporal fluctuation of the pixel value of the original image in which the amount of change in the motion change is not adjusted is also described.

A difference between the pixel value of the pixel 221 of the image adjusted based on the acceleration method or the jerk method and the pixel value of the pixel 221 of the original image is larger than a difference between the pixel value of the pixel 221 of the image adjusted based on the present method, that is, the diffusion result of the phase change and the pixel value of the pixel 221 of the original image. Thus, in the image adjusted based on the diffusion result of the phase change, the adjustment of the random noise is reduced even when the amount of change in the subtle phase change is adjusted. Thus, with the present method, it is possible to reduce the adjustment of the random noise mixed in the moving image based on the diffusion result of the phase change.

Figure 11:
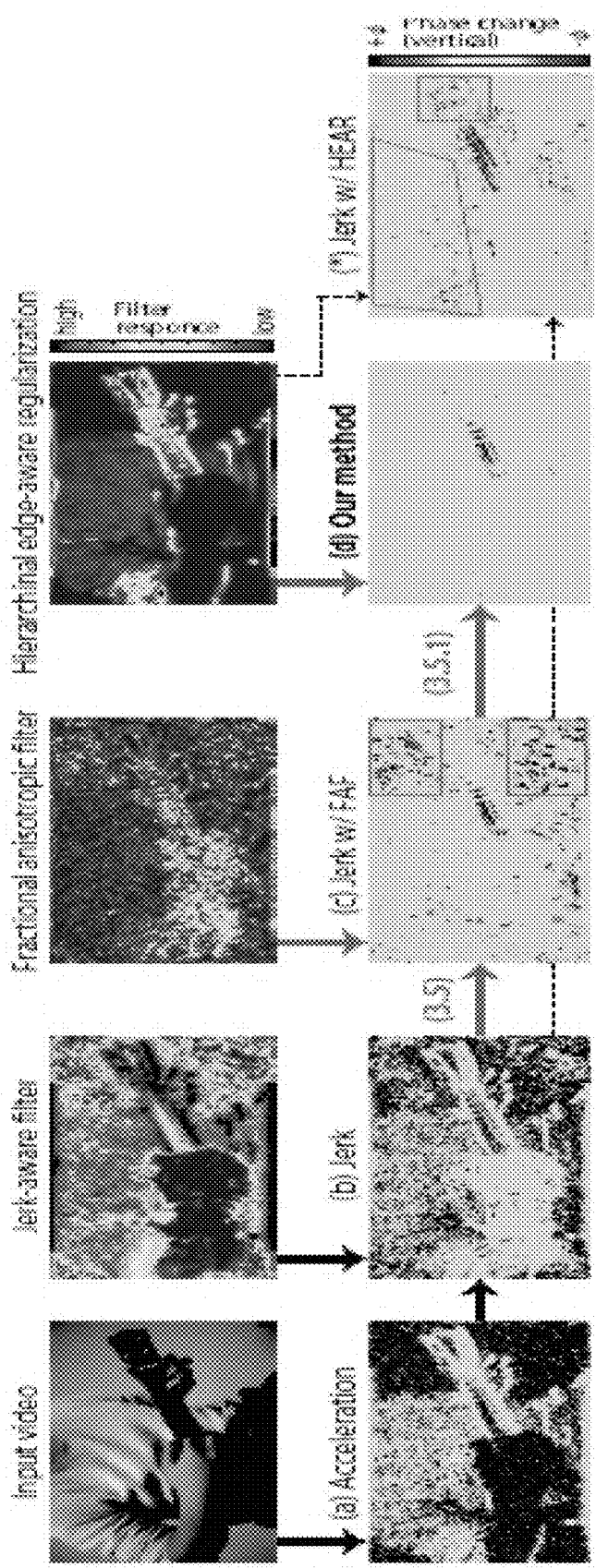
FIG. 11 is a diagram illustrating an effect in a case in which a method in the present disclosure is applied.

FIG. 11 is a diagram illustrating an effect in a case in which a method in the present disclosure has been applied.

As an input image, a frame (input video) in which a scene in which an ukulele is played is imaged will be described as an example. FIG. 11(a) is a diagram illustrating a processing result in a case in which an acceleration method of the related art is used. FIG. 11(b) is a diagram illustrating a processing result in a case in which a jerk method of the related art is used. FIG. 11(c) is a diagram illustrating a processing result in a case in which a method of the second embodiment is used. FIG. 11(d) is a diagram illustrating a processing result in a case in which the methods of the first embodiment and the second embodiment are used in combination. FIG. 11(X) is a diagram illustrating a processing result in a case in which the method of the first embodiment is used.

As illustrated in FIG. 11, in the method illustrated in FIG. 11(a) and the method illustrated in FIG. 11(b), it can be seen that a meaningful subtle phase change of a string of the ukulele can be detected, but random noise is also detected. Further, in the method illustrated in FIG. 11(c) (the method of the second embodiment) and the method illustrated in FIG. 11(X) (the method of the first embodiment), noise is reduced, but often erroneously detected, unlike the method illustrated in FIG. 11(a) and the scheme illustrated in FIG. 11(b). On the other hand, as illustrated in FIG. 11(d), it can be seen that, when the methods of the first embodiment and the second embodiment are used in combination, the meaningful subtle phase change of the string of the ukulele can be accurately detected.

As described above, the image processing apparatus 1a of the second embodiment includes the change detection unit 4a and the reliability estimation unit 51a. The change detection unit 4a detects a predetermined phase change from among the phase changes in the luminance image having multiple resolutions. The reliability estimation unit 51a estimates the reliability "$FAF_{o,\gamma}''(x, y, t)$" of the detected phase change.

This makes it possible for the image processing apparatus 1a to detect a "meaningful" subtle phase change among the detected subtle changes in the video more accurately. Thus, the image processing apparatus 1a can adjust the amount of change in the "meaningful" subtle phase change. Thus, the image processing apparatus 1a can reduce the adjustment of the random noise mixed in the moving image when adjusting the amount of change in the subtle motion change of the moving image.

Third Embodiment

A third embodiment differs from the first and second embodiments in that, when the image processing apparatus adjusts the amount of change in the subtle color or luminance change, the adjustment of the random noise mixed in the moving image is reduced. Differences between the third embodiment and the first and second embodiments will be described.

Figure 12:
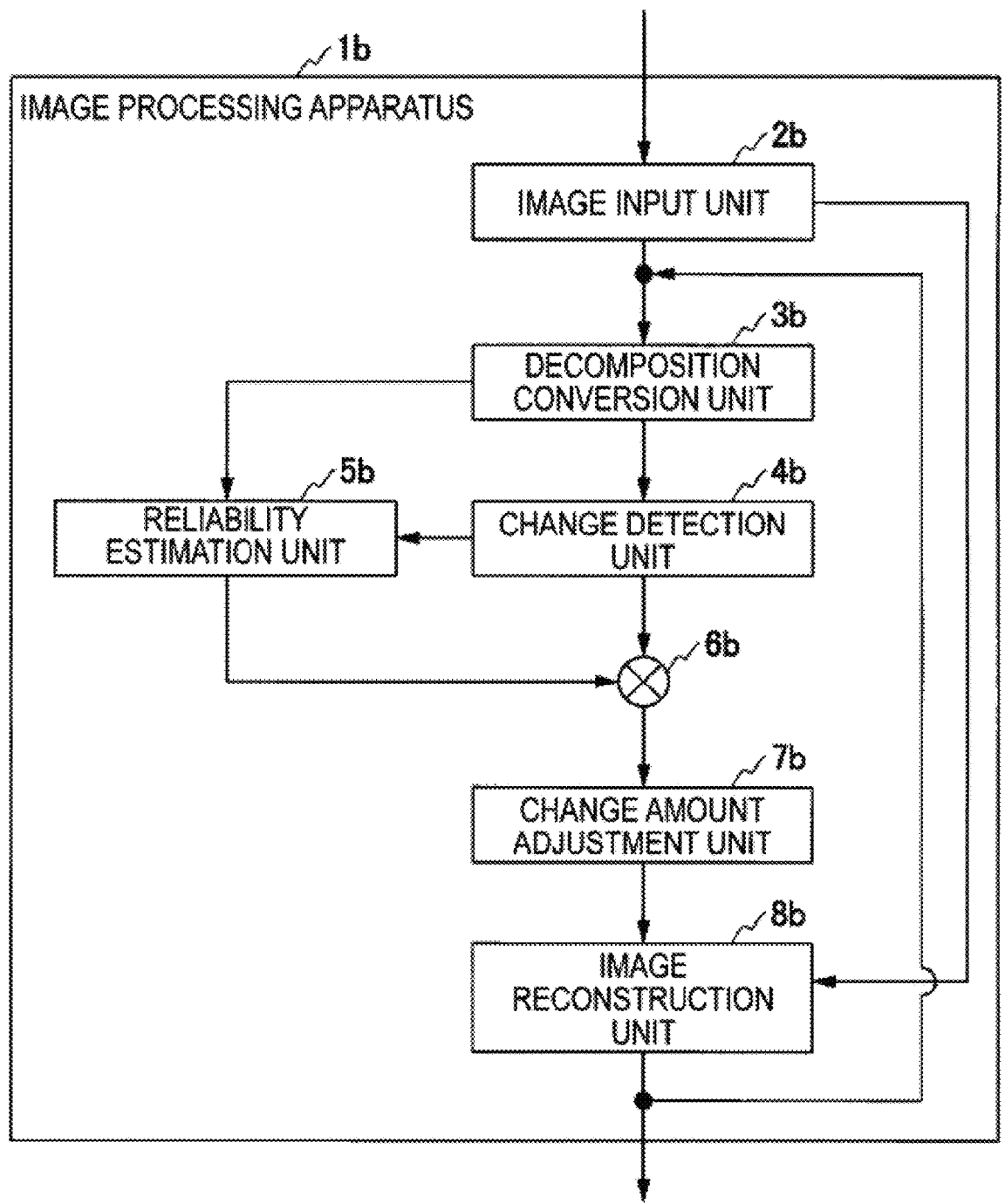
FIG. 12 is a diagram illustrating a configuration example (first combination) of an image processing apparatus in a third embodiment.

FIG. 12 is a diagram illustrating a configuration example (first combination) of an image processing apparatus 1b according to a third embodiment. The image processing apparatus 1b is an apparatus that executes a predetermined image processing on a moving image. The image processing apparatus 1b executes predetermined image processing on the moving image to emphasize or attenuate a specific subtle motion change of the subject and a specific subtle color or luminance change of the subject.

The image processing apparatus 1b includes an image input unit 2b, a decomposition conversion unit 3b, a change detection unit 4b, a reliability estimation unit 5b, a multiplication unit 6b, a change amount adjustment unit 7b, and an image reconstruction unit 8b.

In the third embodiment, the image processing apparatus 1b sequentially executes first image processing and second image processing. That is, the image processing apparatus 1b executes the first image processing on the moving image, and further executes the second image processing on the moving image. An execution order of the first image processing and the second image processing may be reversed.

In the first image processing, each functional unit of the image processing apparatus 1b executes the same processing as each functional unit of the image processing apparatus 1 of the first embodiment. That is, the image processing apparatus 1b executes the first image processing on the moving image to emphasize or attenuate a subtle motion change of the subject.

The image processing apparatus 1b executes the second image processing on the moving image to emphasize or attenuate a specific subtle color or luminance change of the subject. In the second image processing, the adjustment rate "α" of the phase change is 0. For example, the image processing apparatus 1b emphasizes or attenuates a selected pixel value in the moving image to emphasize or attenuate a specific subtle color or luminance change of the subject. Here, the selected pixel value is a pixel value of the color or luminance selected as a processing target in advance, and is, for example, any one of a pixel value of R, a pixel value of G, a pixel value of B, a pixel value of Y, a pixel value of E, and a pixel value of Q. The pixel values of Y, E, and Q are values indicating brightness converted from RGB.

Next, processing of emphasizing or attenuating subtle color or luminance change will be described.

Figure 13:
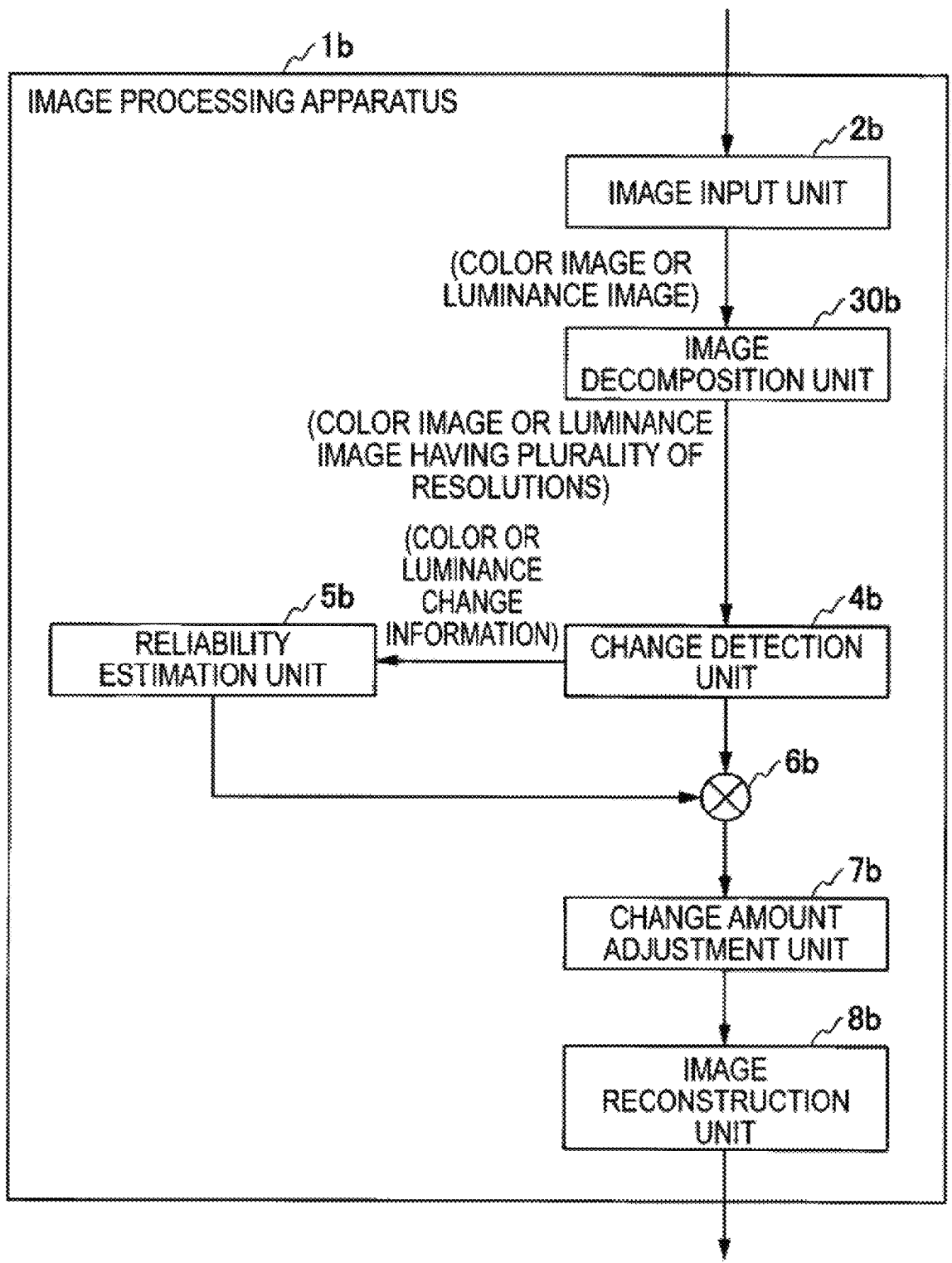
FIG. 13 is a diagram illustrating a configuration example of each functional unit that emphasizes or attenuates a specific subtle color or luminance change of a subject in the third embodiment.

FIG. 13 is a diagram illustrating a configuration example of each functional unit that emphasizes or attenuates a specific subtle color or luminance change of a subject. The decomposition conversion unit 3b illustrated in FIG. 12 includes an image decomposition unit 30b. The image processing apparatus 1b includes an image input unit 2b, an image decomposition unit 30b, a change detection unit 4b, a reliability estimation unit 5b, a multiplication unit 6b, a change amount adjustment unit 7b, and an image reconstruction unit 8b as respective functional units that emphasize or attenuate the specific subtle color or luminance change of the subject.

The image input unit 2b receives multiple frames of a moving image that is an image processing target and information on color or luminance selected as a processing target. Alternatively, the image input unit 2b receives a color image or a luminance image after conversion of the frames of the moving image to an predetermined luminance space or color space. The image input unit 2b outputs an original resolution color image or luminance image that is an image processing target and the information on the selected color or luminance to the image decomposition unit 30b. In the following description, a case in which the original resolution color image is input will be described as an example. Processing when the luminance image is input instead of the color image is also the same as that when the color image is input.

The image decomposition unit 30b receives the original resolution color image that is an image processing target and information on the selected color. The image decomposition unit 30b decomposes the color image of the information on the selected color among the original resolution color images at time t of the received moving image into mutually different resolutions. Specifically, the image decomposition unit 30b repeats processing of convolving the Gaussian filter with respect to the color image having the information on the selected color in the received original resolution color image and then performing downsampling multiple times to decompose the received original resolution color image into multiple resolutions. Downsampling is processing of reducing the resolution based on an amount of downsampling. The amount of downsampling has a value smaller than 1 (for example, ½). The image decomposition unit 30b outputs a color image having mutually different resolutions to the change detection unit 4.

Figure 14:
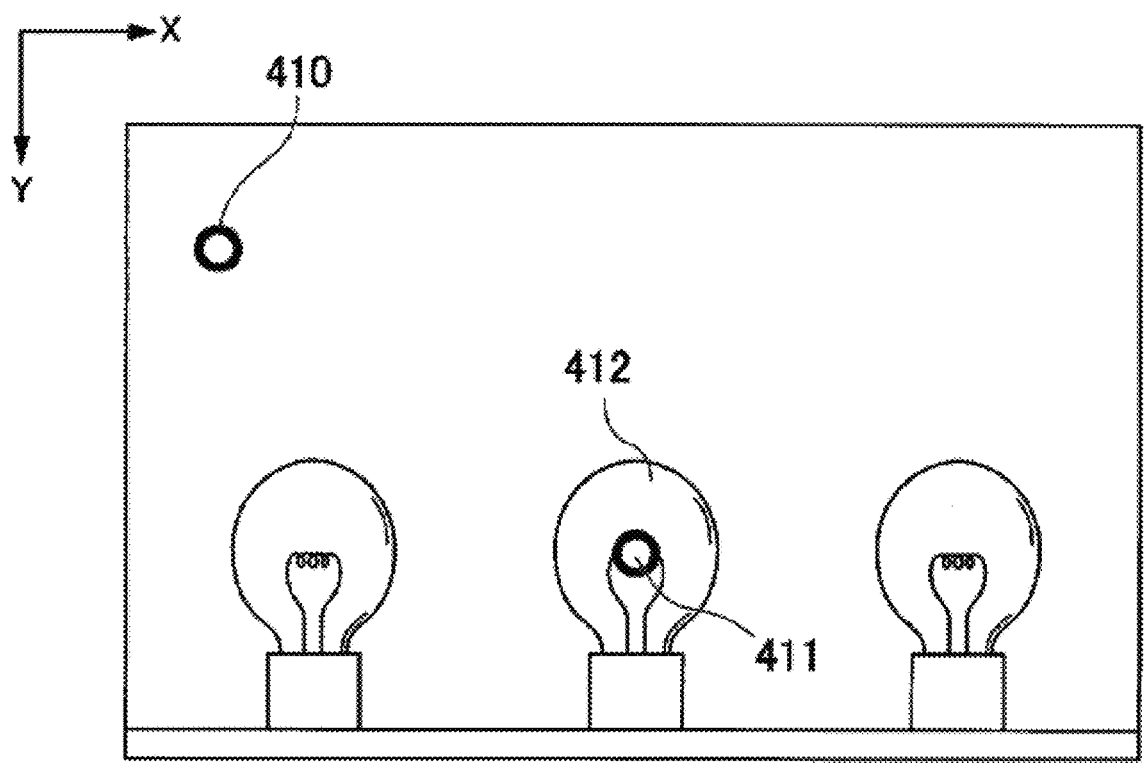
FIG. 14 is a diagram illustrating an example of pixels in a frame of a moving image in the third embodiment.

FIG. 14 is a diagram illustrating an example of pixels in a frame of a moving image. Hereinafter, an x-coordinate in a horizontal direction and a y-coordinate in a vertical direction are determined in the frame of the moving image. In the frame illustrated in FIG. 14, a state in which three light bulbs are lit is imaged. The frame illustrated in FIG. 14 includes a pixel 410, a pixel 411, and a light bulb image 412. The pixel 410 is a pixel included in a background image captured in a third partial region of the frame. The pixel 411 is a pixel included in the light bulb image 412 captured in a fourth partial region of the frame.

Figure 15:
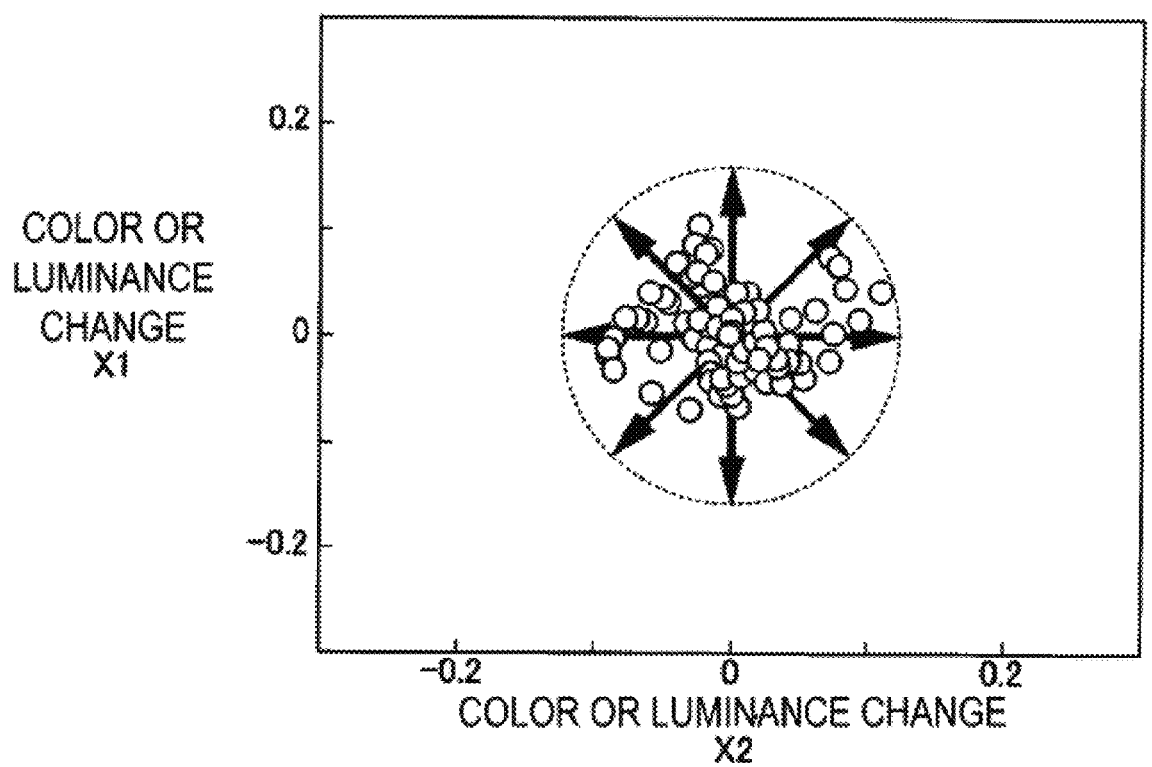
FIG. 15 is a diagram illustrating isotropic diffusion of subtle color or luminance changes in the third embodiment.

FIG. 15 is a diagram illustrating isotropic diffusion of the subtle color or luminance change. In FIG. 15, a vertical axis indicates change in color or luminance of a certain pixel x1 in a frame, and a horizontal axis indicates change in color or luminance of a certain pixel x2 in the frame. A subtle color or luminance change illustrated in FIG. 15 is a temporal subtle color or luminance change in a color image or luminance image. A meaningless change in subtle color or luminance is isotropic diffusion, as in an example illustrated in FIG. 15.

Figure 16:
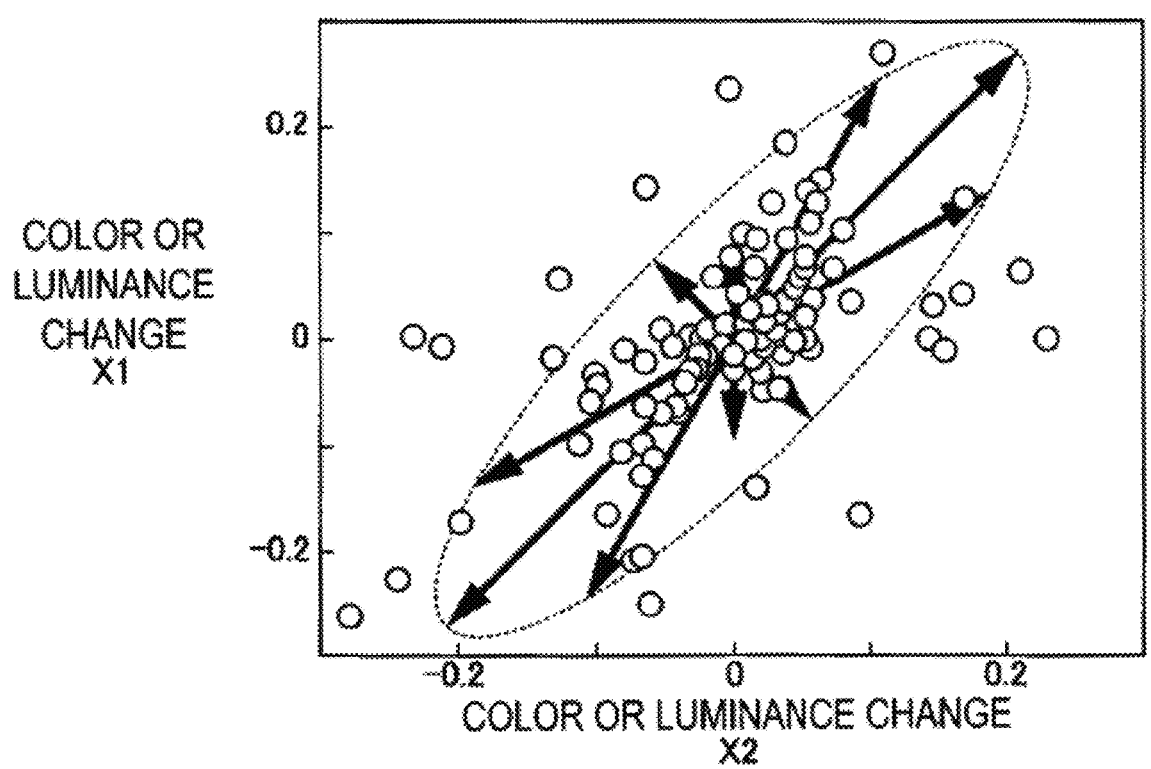
FIG. 16 is a diagram illustrating anisotropic diffusion of subtle color or luminance changes in the third embodiment.

FIG. 16 is a diagram illustrating anisotropic diffusion of the subtle color or luminance change. In FIG. 16, a vertical axis indicates change in color or luminance of a certain pixel x1 in a frame, and a horizontal axis indicates change in color or luminance of a certain pixel x2 in the frame. A subtle color or luminance change illustrated in FIG. 16 is a temporal subtle color or luminance change in a color image or luminance image. A meaningful subtle color or luminance change is the anisotropic diffusion. An amount of change in the meaningful subtle color or luminance change changes so that a time distribution is biased in a specific direction.

Referring back to FIG. 13, the description of the configuration example of the image processing apparatus 1b will be continued. The change detection unit 4b receives the color image having each resolution output from the image decomposition unit 30b. The change detection unit 4b detects subtle change in color in the color image having each resolution based on the received color image having each resolution. The change detection unit 4b outputs information indicating the detected subtle color or luminance change in the color image or luminance image (hereinafter referred to as "color or luminance change information") to the reliability estimation unit 5b and the multiplication unit 6b for each resolution.

The reliability estimation unit 5b receives the color or luminance change information. The reliability estimation unit 5b estimates the reliability of the subtle color or luminance change "B"(x, y, t)" based on the received color or luminance change information. The reliability of the subtle color or luminance change is reliability of a subtle color or luminance change that occurs in a pixel value of an image due to a physical phenomenon other than random noise. The reliability estimation unit 5b estimates the reliability so that the reliability of the subtle color or luminance change occurring in the pixel value of the image due to the random noise mixed in the image due to, for example, thermal noise of the image sensor is lower than the reliability of the subtle color or luminance change occurring in the pixel value of the image due to the physical phenomenon other than the random noise. The reliability estimation unit 5b outputs the estimated reliability to the multiplication unit 6b. The reliability estimation unit 5b outputs the estimated reliability to the multiplication unit 6b. The reliability estimated by the reliability estimation unit 5b in the present embodiment has a greater value as a time distribution of the subtle color or luminance change indicates more anisotropic. In other words, the reliability has a greater value as a diffusion result indicates more anisotropic.

The multiplication unit 6b receives the color or luminance change information and the reliability. The multiplication unit 6b multiplies the received color or luminance change information by the reliability for each pixel, and outputs a result of the multiplication (a multiplication result) to the change amount adjustment unit 7b. The multiplication unit 6b multiplies the color or luminance change information by the reliability so that the subtle color or luminance change "^C"(x, y, t, θ)" occurring in the pixel value of the image due to the physical phenomenon other than random noise is detected with high accuracy.

The change amount adjustment unit 7b receives the multiplication result (the color or luminance change multiplied by the reliability) output by the multiplication unit 6b. The change amount adjustment unit 7b executes video magnification for the received multiplication result of the multiplication unit 6b. That is, the change amount adjustment unit 7b adjusts an amount of change in a subtle color or luminance change multiplied by the reliability through emphasis or attenuation. Thus, the change amount adjustment unit 7b generates an image in which the amount of change in the subtle color or luminance change has been adjusted (hereinafter referred to as an "adjusted image"), for each resolution. The change amount adjustment unit 7b outputs multiple adjusted images having mutually different resolutions to the image reconstruction unit 8b.

The image reconstruction unit 8b (image combination unit) receives the multiple adjusted images having mutually different resolutions. The image reconstruction unit 8b (image combination unit) reconstructs an image based on the received adjusted images. Specifically, the image reconstruction unit 8b adjusts sizes of the multiple adjusted images having mutually different resolutions to the same size, and performs addition to reconstruct an image in which the subtle color or luminance change has been emphasized. When the conversion to the color space or the luminance space has been performed, the image reconstruction unit 8b performs inverse conversion thereof to obtain a final video output. The image reconstruction unit 8b outputs an image after the combination as an image finally adjusted using the video magnification to a predetermined external device.

Next, the image processing apparatus 1b will be described in detail. The image input unit 2b acquires the multiple frames of the moving image that is an image processing target and information on color or luminance selected as a processing target. The image input unit 2b outputs an original resolution color image or luminance image that is an image processing target and the information on the selected color or luminance to the image decomposition unit 30b.

The image decomposition unit 30b decomposes the color image of the information on the selected color among the original resolution color images at time t of the received moving image into mutually different resolutions. The image decomposition unit 30b outputs a color image having mutually different resolutions to the change detection unit 4b.

The change detection unit 4b detects subtle change in color in the color image in the color image having each resolution. When a luminance image having each resolution is input, the change detection unit 4b detects a subtle change in the luminance in the luminance image having each resolution. The change detection unit 4b convolves a temporal filter "H(t)" having a frequency response with a subtle change to be emphasized with respect to the color or luminance change "I''(x, y, t))" in the video having each resolution obtained in the image decomposition unit 30b or multiplies the color or luminance change by a spatiotemporal filter "J(x, y, t)" for removing large change to detect the subtle color or luminance change "B''(x, y, t)" as in Equation (15) below. The change detection unit 4b may not multiply the color or luminance change by the spatiotemporal filter "J(x, y, t)". That is, when the change detection unit 4b detects the subtle color or luminance change "B''(x, y, t)", the change detection unit 4b may not use the spatiotemporal filter "J(x, y, t).

[Math. 15]

$$B''(x,y,t)=j(x,y,t)\cdot(H(t)\otimes I''(x,y,t)) \quad (15)$$

In Equation (15), among operators, an operator including a mark "x" in a mark "O" indicates a convolution operator, and an operator "O" indicates a multiplication (element-wise product). H(t) indicates a bandpass filter, and "J(x, y, t)" is a jerk filter for the purpose of removing only abrupt change, which is a representative example. A filter that is used by the change detection unit 4b is not limited thereto.

The subtle color or luminance change "B''(x, y, t)" obtained by the change detection unit 4b includes a "meaningful" subtle color or luminance change caused by a natural phenomenon or a physical phenomenon and a "meaningless" subtle color or luminance change derived from noise mixed in an imaging process like the random noise mixed in the image due to, for example, thermal noise of the image sensor as in Equation (16) below. The noise mixed in the imaging process is, for example, thermal noise, camera shake, ground vibration, or the like.

[Math. 16]

$$B''(x,y,t)=\hat{B}''(x,y,t)+\tilde{B}''(x,y,t) \quad (16)$$

In Equation (16), "^B''(x, y, t)" indicates a "meaningful" subtle color or luminance change, and "~B''(x, y, t)" indicates a "meaningless" subtle color or luminance change.

The reliability estimation unit 5b uses the subtle color or luminance change "B''(x, y, t)" obtained by a change detection unit 4b to estimate the reliability of the subtle color or luminance change "B''(x, y, t)". Specifically, the reliability estimation unit 5b evaluates a temporal behavior (time distribution) of the subtle color or luminance change "B''(x, y, t)" obtained by the change detection unit 4b to estimate the reliability of the subtle color or luminance change. Considering a video region $(-)x \in R^{(h \times w)} = R^d$ around a certain place (x, y) and a time width "(-)t" around a certain time t with respect to the subtle color or luminance change "B''(x, y, t)" output from the change detection unit 4b, a diffusion equation regarding the subtle color or luminance change "B''((-)x, (-)t)" can be formulated as in Equation (17) below.

[Math. 17]

$$f(B^n(\overline{x}, \overline{t})) = \frac{1}{(2\pi)^{d/2}|D|^{1/2}} \exp\left(-\frac{1}{2}B^n(\overline{x})^T D^{-1} B^n(\overline{x})\right) \quad (17)$$

In Equation (17), "f(B''((-)x, (-)t))" indicates the time distribution of the subtle color or luminance change, and "D" indicates a diffusion tensor matrix in the time width "(-)t". From Equation (17) above, the diffusion tensor matrix can be obtained to be in Equation (18) below.

[Math. 18]

$$D=\text{cov}(B^n(\overline{x},\overline{t})) \quad (18)$$

In Equation (18), "cov(X)" means that a variance-covariance matrix of an X matrix is calculated. Thereafter, the reliability estimation unit 5b performs eigendecomposition on "D" to obtain a fractional anisotropy (hereinafter referred to as "FA"), which is a feature quantity regarding the time distribution of the subtle color or luminance change, from Equation (19) below.

[Math. 19]

$$FA^n(x, y, t) := \sqrt{\frac{d}{d-1}} \cdot \frac{\sqrt{\sum_{i=1}^{n}(\lambda_i - \overline{\lambda})^2}}{\sqrt{\sum_{i=1}^{n}\lambda_i^2}} \quad (19)$$

In Equation (19), ($\lambda_1, \ldots, \lambda_d$) are eigenvalues of "D", "(-)λ" is an average thereof, and "d" indicates the number of pixels that are processing targets. Here, the number "d" of pixels that are processing targets is the number of pixels to be adjusted. "FA" is a feature quantity having "1" when the time distribution indicates anisotropy and "0" when the time distribution indicates isotropy. The "meaningful" subtle color or luminance change caused by a natural phenomenon or physical phenomenon has a biased time distribution in a specific direction and has high anisotropy. Thus, the "meaningful" subtle color or luminance change indicates an FA value close to "1". On the other hand, the "meaningless" subtle color or luminance change derived from noise mixed in the imaging process has a time distribution diffused in random directions, has low anisotropy, and has high isotropy. Thus, the "meaningless" subtle color or luminance change has an FA value close to "0". Thus, the reliability estimation unit 5 estimates the reliability of the subtle color or luminance change based on Equation (20) below using the FA.

[Math. 20]

$$FAF_{\sigma,\gamma}^n(x,y,t) = (\text{Norm}(G_\sigma \otimes FA^n(x,y,t))^\gamma \quad (20)$$

In Equation (20), "$FAF_{\sigma,\gamma}^n$(x, y, t)" is the spatiotemporal filter indicating the reliability of the subtle color or luminance change, "$G_\sigma$" is a function for spatially smoothing "FAF$_{σ,γ}''$(x, y, t)", and the parameter "σ" is a parameter indicating the strength of smoothing. Further, "Norm(X)" indicates that a value of the argument "X" is normalized to a range from 0 to 1. A method of spatially smoothing the parameter "G$_σ$" and a method of normalization are not limited to specific methods. The reliability "FAF$_{σ,γ}''$(x, y, t)" indicates reliability of the subtle color or luminance change in a region including the coordinates (x, y) in a range from 0 to 1. The reliability of the subtle color or luminance change become higher when the value becomes greater.

The multiplication unit 6b multiplies the color or luminance change information by the reliability estimated by the reliability estimation unit 5b for each pixel. More specifically, the multiplication unit 6b multiplies the reliability "FAF$_{σ,γ}''$(x, y, t)" described in Equation (20) by "B''(x, y, t)" described in Equation (15), as in Equation (21) below.

[Math. 21]

$$\hat{B}''(x,y,t) = FAF_{σ,γ}''(x,y,t) \cdot B''(x,y,t) \qquad (21)$$

According to Equation (21), the subtle color or luminance change "^B''(x, y, t)" that occurs in the pixel value of the image due to the physical phenomenon other than the random noise is detected with high accuracy.

The change amount adjustment unit 7b multiplies the subtle color or luminance change "^B''(x, y, t)" obtained using Equation (21) by the predetermined adjustment rate (emphasis rate) "α". That is, the change amount adjustment unit 7b multiplies the subtle color or luminance change "^B''(x, y, t)" derived with high accuracy as in Equation (21) by the predetermined adjustment rate (emphasis rate) "α", as in Equation (22) below. The change amount adjustment unit 7b adds the change "I''(x, y, t)" in color or luminance of a change source of the original color or luminance to a multiplication result to derive the change "^I''(x, y, t)" in color or luminance in which the amount of change in the gentle and subtle color or luminance change has been adjusted (for example, emphasized or attenuated), as in Equation (22).

[Math. 22]

$$\hat{I}''(x,y,t) = I''(x,y,t) + α \cdot \hat{B}''(x,y,t) \qquad (22)$$

Thus, the change amount adjustment unit 7b adjusts the amount of change in the detected subtle color or luminance change. The adjustment rate may be the same or different for each resolution, direction, time, or position.

When the subtle color or luminance is emphasized, the predetermined adjustment rate "α" is set to a positive value greater than 0. When the subtle color or luminance is attenuated, the predetermined adjustment rate "α" is set to a negative value smaller than 0. An upper limit value and a lower limit value of "α" may not be specifically determined. However, for example, when the subtle color or luminance is attenuated, a value of the predetermined adjustment rate "α" in a case in which a value of an original subtle color or luminance change "I''(x, y, t)" becomes 0 is set as the lower limit value of "α". When "α" is set to 0, the subtle color or luminance change is not adjusted.

The image reconstruction unit 8b (image combination unit) reconstructs the image. The image reconstruction unit 8b solves Equation (22) for each resolution, and performs addition in the resolution direction while performing upsampling to perform conversion to color or luminance information in which only the "meaningful" subtle color or luminance change has been emphasized and reconstruct the original resolution image. When conversion to a color space or a luminance space has been performed, the image reconstruction unit 8b can perform inverse conversion thereof to obtain a final video output.

The image reconstruction unit 8b combines the original resolution image in which the color or luminance change has been emphasized with the reconstructed original resolution luminance image. For example, the image reconstruction unit 8b generates an average image of the original resolution image in which the color or luminance change has been emphasized and the reconstructed original resolution luminance image.

Figure 17:
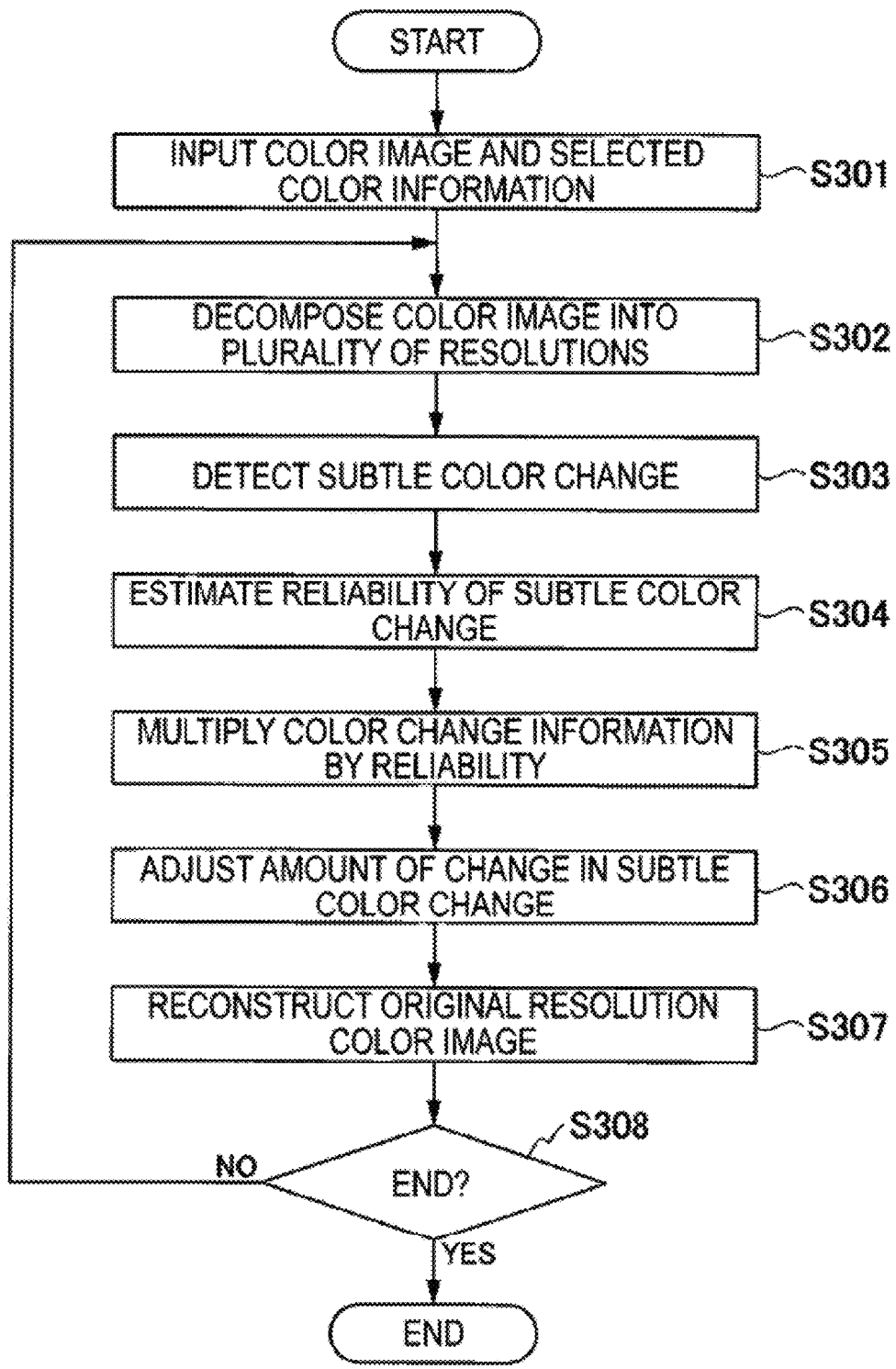
FIG. 17 is a flowchart illustrating an operation example of the image processing apparatus in the third embodiment.

Next, an operation example of the image processing apparatus 1b will be described. FIG. 17 is a flowchart illustrating an operation example of the image processing apparatus 1b according to the third embodiment. A case in which the original resolution color image that is an image processing target and the information on the selected color are input to the image input unit 2b will be described as an example with reference to FIG. 17. When the original resolution luminance image that is an image processing target and the information on the selected luminance are input to the image input unit 2b, it is only required that the original resolution color image is read as the original resolution luminance image and the color information is read as the luminance information in the processing of FIG. 17.

The image input unit 2b inputs the original resolution color image that is an image processing target and the information on the selected color (step S301). The image input unit 2b outputs the original resolution color image and the information on the selected color to the image decomposition unit 30b. The image decomposition unit 30b decomposes the color image having the information on the selected color among the original resolution color images at time t of the received moving image into mutually different resolutions (step S302). The image decomposition unit 30b outputs the color image having each resolution to the change detection unit 4b.

The change detection unit 4b detects the subtle change in color in the color image having each resolution based on the color image output from the image decomposition unit 30b (step S303). The change detection unit 4b outputs the detected subtle change in the color of each resolution as color or luminance change information to the reliability estimation unit 5b and the multiplication unit 6b.

The reliability estimation unit 5b estimates the reliability "FAF$_{σ,γ}''$(x, y, t)" of the subtle color or luminance change "B''(x, y, t)" based on the color or luminance change information output from the change detection unit 4b (step S304). The reliability estimation unit 5b outputs the estimated reliability "FAF$_{σ,γ}''$(x, y, t)" to the multiplication unit 6b.

The multiplication unit 6b multiplies the color or luminance change information output from the change detection unit 4b by the reliability "FAF$_{σ,γ}''$(x, y, t)" output from the reliability estimation unit 5b (step S305). The multiplication unit 6b outputs a multiplication result to the change amount adjustment unit 7b. The change amount adjustment unit 7b uses the multiplication result output from the multiplication unit 6b to adjust the amount of change in the subtle color or luminance change multiplied by the reliability through emphasis or attenuation (step S306). The change amount adjustment unit 7b outputs information on the amount of change in the subtle color or luminance change to the image reconstruction unit 8b. The image reconstruction unit 8b reconstructs the original resolution color image based on multiple adjusted images having mutually different resolutions (step S307).

The image decomposition unit 30b determines whether the image processing apparatus 1b ends the processing based on, for example, an instruction obtained from the user (step S308). When the image processing apparatus 1b continues the processing (step S308: NO), each functional unit of the image processing apparatus 1b returns the processing to step S302. When the image processing apparatus 1b ends the processing (step S308: YES), each functional unit of the image processing apparatus 1b ends the processing.

As described above, the image processing apparatus 1b of the third embodiment includes the change detection unit 4b and the reliability estimation unit 5b. The change detection unit 4b detects a predetermined color or luminance change from among color or luminance changes in the color or luminance image having multiple resolutions. The reliability estimation unit 5b estimates the reliability "$FAF_{\sigma,\gamma}''(x, y, t)$" of the detected color or luminance change based on temporal color or luminance change in the color or luminance image.

Thus, the image processing apparatus 1b can more accurately detect the "meaningful" subtle color or luminance change among the detected subtle changes in the video. Thus, the image processing apparatus 1b can adjust the amount of change in the "meaningful" subtle color or luminance change. Thus, the image processing apparatus 1b can reduce the adjustment of the random noise mixed in the moving image when adjusting the amount of change in the subtle color or the luminance change of the moving image.

Figure 18:
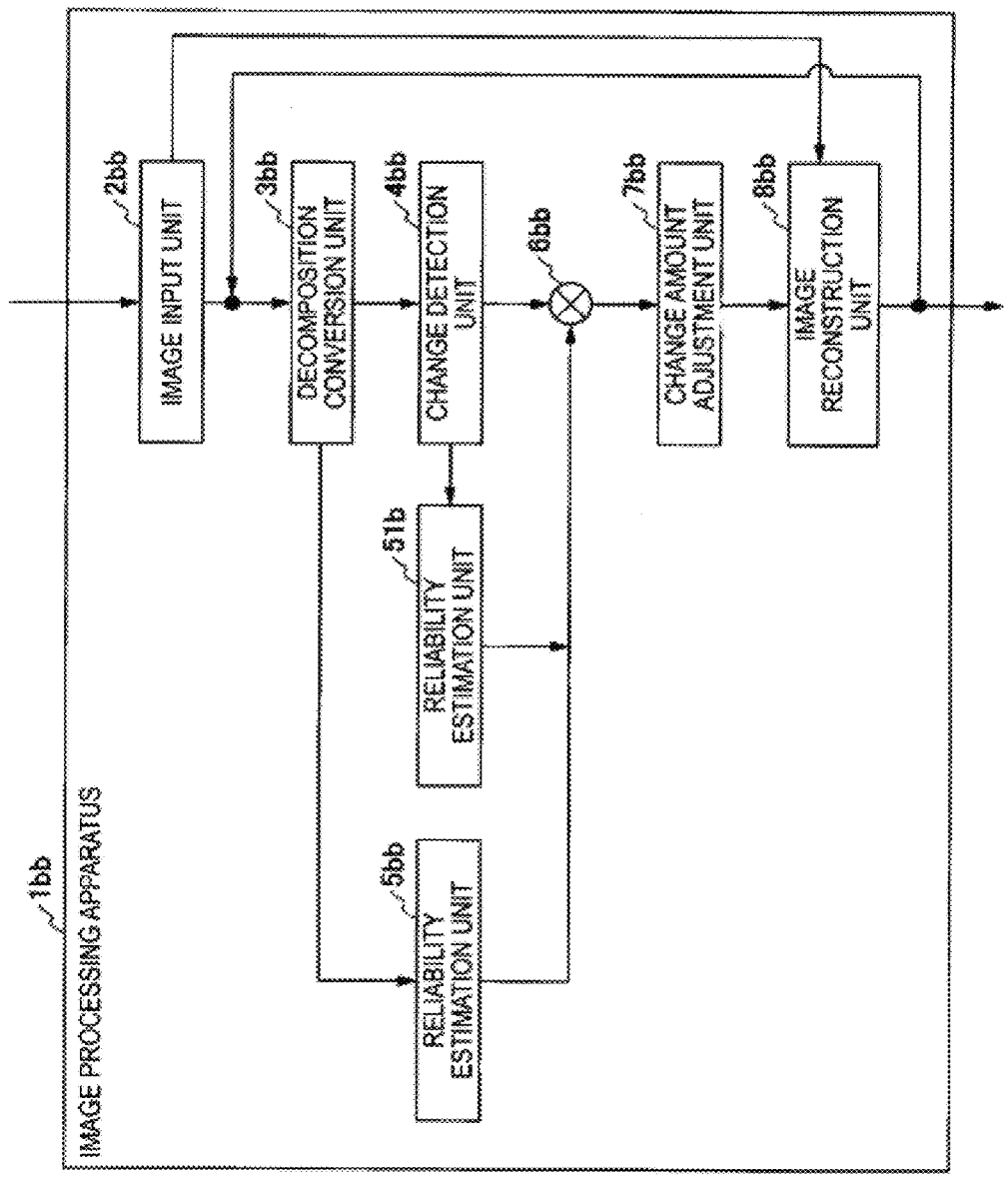
FIG. 18 is a diagram illustrating a configuration example (second combination) of the image processing apparatus in the third embodiment.

Hereinafter, a modification example of the third embodiment will be described. The image processing apparatus according to the third embodiment may be configured to sequentially execute processing of adjusting the amount of change in the phase change (motion change), which is executed by the image processing apparatus 1a according to the second embodiment, and processing of emphasizing or attenuating the specific subtle color or luminance change of the subject illustrated in FIG. 13. A configuration in the case of such a configuration is illustrated in FIG. 18. FIG. 18 is a diagram illustrating a configuration example (second combination) of an image processing apparatus 1bb according to the third embodiment. The image processing apparatus 1bb includes an image input unit 2bb, a decomposition conversion unit 3bb, a change detection unit 4bb, a reliability estimation unit 5bb, a multiplication unit 6bb, a change amount adjustment unit 7bb, an image reconstruction unit 8bb, and a reliability estimation unit 51b. The decomposition conversion unit 3bb includes an image decomposition unit 30b illustrated in FIG. 13.

The image processing apparatus 1bb sequentially executes first image processing and second image processing. For example, the image processing apparatus 1bb executes the same processing as the image processing apparatus 1a of the second embodiment as the first image processing. That is, the image processing apparatus 1bb executes the first image processing on the moving image to emphasize or attenuate a subtle motion change of the subject. The image processing apparatus 1bb executes the same processing as the functional unit illustrated in FIG. 13 of the image processing apparatus 1b of the third embodiment as the second image processing.

Figure 19:
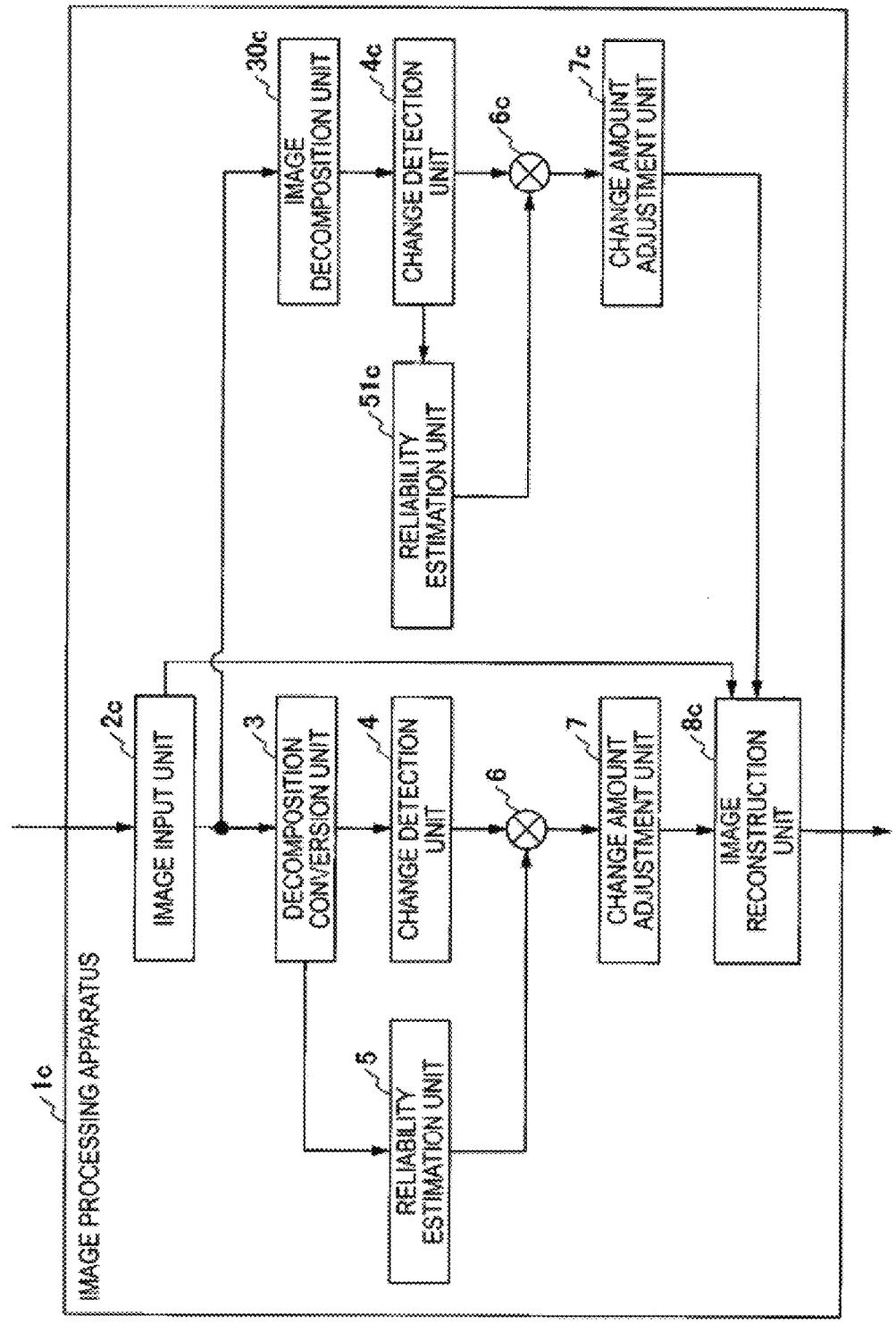
FIG. 19 is a diagram illustrating a configuration example (third combination) of the image processing apparatus in the third embodiment.

The image processing apparatus according to the third embodiment may be configured to execute, in parallel, processing of adjusting the specific subtle motion change of the subject, which is executed by the image processing apparatus 1 according to the first embodiment, and processing of adjusting the amount of change in the subtle color or luminance change described in the present embodiment. FIG. 19 illustrates a configuration in the case of such a configuration. FIG. 19 is a diagram illustrating a configuration example (third combination) of an image processing apparatus 1c according to the third embodiment. The image processing apparatus 1c includes an image input unit 2c, a decomposition conversion unit 3, a change detection unit 4, a reliability estimation unit 5, a multiplication unit 6, a change amount adjustment unit 7, an image reconstruction unit 8c, an image decomposition unit 30c, a change detection unit 4c, a reliability estimation unit 51c, a multiplication unit 6c, and a change amount adjustment unit 7c.

The image processing apparatus 1c executes the first image processing and the second image processing in parallel. The image processing apparatus 1c executes the first image processing on the moving image to emphasize or attenuate the subtle motion change of the subject. In the first image processing that is executed by the image processing apparatus 1c, the image input unit 2b, the decomposition conversion unit 3, the change detection unit 4, the reliability estimation unit 5, the multiplication unit 6, the change amount adjustment unit 7, and the image reconstruction unit 8c execute the same processing as the respective functional units of the image processing apparatus 1 of the first embodiment.

The image processing apparatus 1c executes the second image processing on the moving image to emphasize or attenuate the specific subtle color or luminance change of the subject. In the second image processing that is executed by the image processing apparatus 1c, the image input unit 2c, the image decomposition unit 30c, the change detection unit 4c, the reliability estimation unit 51c, the multiplication unit 6c, the change amount adjustment unit 7c, and the image reconstruction unit 8c execute the same processing as the functional units having the same name illustrated in FIG. 13.

The image reconstruction unit 8c acquires multiple images having mutually different resolutions from the change amount adjustment unit 7. The image reconstruction unit 8c combines the multiple images having mutually different resolutions to reconstruct an original resolution luminance image. The image reconstruction unit 8c may acquire an original resolution color image from the image input unit 2c. The image reconstruction unit 8c may combine the reconstructed original resolution luminance image with the original resolution color image.

The image reconstruction unit 8c acquires the original resolution image in which the color or luminance change has been emphasized from the change amount adjustment unit 7c. The image reconstruction unit 8c combines the original resolution image in which the color or luminance change has been emphasized with the reconstructed original resolution luminance image. For example, the image reconstruction unit 8c generates an average image of the original resolution image in which the color or luminance change has been emphasized and the reconstructed original resolution luminance image.

Figure 20:
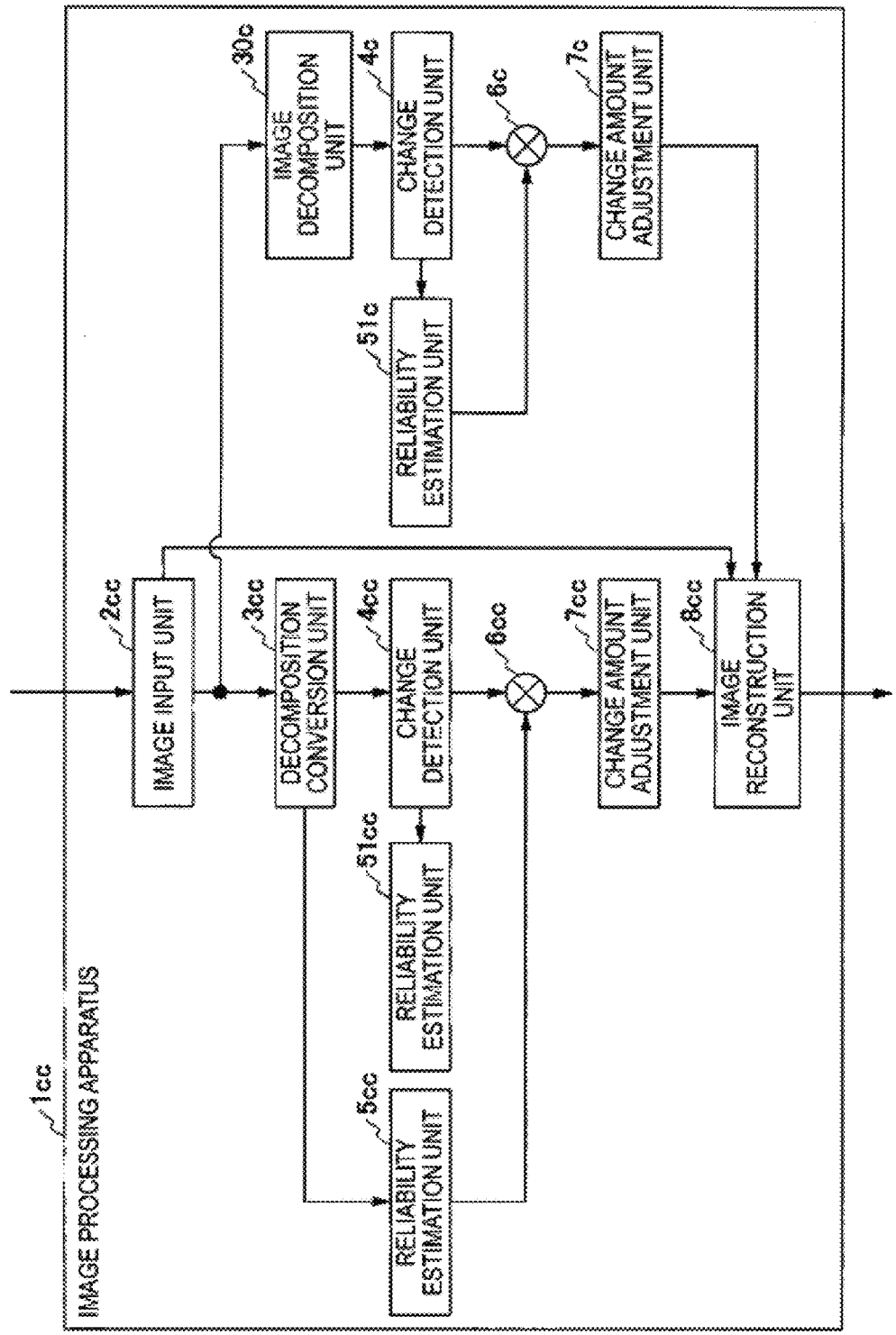
FIG. 20 is a diagram illustrating a configuration example (fourth combination) of the image processing apparatus in the third embodiment.

The image processing apparatus according to the third embodiment may be configured to execute, in parallel, the processing of adjusting the amount of change in the phase change (motion change), which is executed by the image processing apparatus 1a of the second embodiment, the processing of emphasizing or attenuating the specific subtle color or luminance change of the subject illustrated in FIG. 13, and the processing of adjusting the specific subtle motion change of the subject. FIG. 20 illustrates a configuration in the case of such a configuration. FIG. 20 is a diagram illustrating a configuration example (fourth combination) of the image processing apparatus 1cc in the third embodiment.

The image processing apparatus 1cc includes an image input unit 2cc, a decomposition conversion unit 3cc, a change detection unit 4cc, a reliability estimation unit 5cc, a multiplication unit 6cc, a change amount adjustment unit 7cc, an image reconstruction unit 8cc, an image decomposition unit 30c, a change detection unit 4c, a reliability estimation unit 51c, a multiplication unit 6c, and a change amount adjustment unit 7c.

The image processing apparatus 1cc executes first image processing and second image processing in parallel. The image processing apparatus 1cc executes the first image processing on the moving image to emphasize or attenuate subtle motion change of the subject. In the first image processing that is executed by the image processing apparatus 1cc, the image input unit 2cc, the decomposition conversion unit 3cc, the change detection unit 4cc, the reliability estimation unit 5cc, the multiplication unit 6cc, the change amount adjustment unit 7cc, and the image reconstruction unit 8cc execute the same processing as the respective functional units of the image processing apparatus 1a of the second embodiment.

The image processing apparatus 1cc executes the second image processing on the moving image to emphasize or attenuate the specific subtle color or luminance change of the subject. In the second image processing that is executed by the image processing apparatus 1cc, the image input unit 2cc, the image decomposition unit 30c, the change detection unit 4c, the reliability estimation unit 51c, the multiplication unit 6c, the change amount adjustment unit 7c, and the image reconstruction unit 8cc execute the same processing as the functional units having the same name illustrated in FIG. 19.

The above embodiments may be combined with each other.

Although the embodiments of the present disclosure have been described in detail with reference to the drawings, a specific configuration is not limited to the embodiments, and includes designs and the like in a range not departing from the gist of the present disclosure.

INDUSTRIAL APPLICABILITY

The present disclosure is applicable to an image processing apparatus.

REFERENCE SIGNS LIST 1, 1a, 1b, 1bb, 1c, 1cc Image processing apparatus
2, 2b, 2bb, 2c, 2cc Image input unit
3, 3b, 3bb, 3cc Decomposition conversion unit
4, 4a, 4b, 4bb, 4cc Change detection unit
5, 5b, 5bb, 5cc, 51a, 51c, 51cc Reliability estimation unit
6, 6a, 6b, 6bb, 6c, 6cc Multiplication unit
7, 7b, 7bb, 7c, 7cc Change amount adjustment unit
8, 8b, 8bb, 8c, 8cc Image reconstruction unit
30b, 30c Image decomposition unit

The invention claimed is:

1. An image processing apparatus comprising:
a change detector configured to detect, from among phase changes in a luminance image, phase changes in multiple predetermined directions in units of mutually different resolutions; and
a reliability estimator configured to estimate reliability of a phase change of the phase changes that are detected based on temporal amplitude change information in multiple directions determined in the luminance image,
wherein each of the change detector, and the reliability estimator is implemented by:
i) a non-transitory computer readable media storing computer executable instructions executed by at least one processor,
ii) at least one circuitry or
iii) a combination of a non-transitory computer readable media storing computer executable instructions executed by at least one processor and at least one circuitry.

2. The image processing apparatus according to claim 1, wherein the reliability estimator estimates the reliability using a value of an amplitude change equal to or greater than a predetermined threshold value among amplitude changes at multiple resolutions.

3. The image processing apparatus according to claim 2, wherein the reliability becomes a greater value as the amplitude change becomes larger.

4. The image processing apparatus according to claim 1, further comprising:
a multiplier configured to multiply, by the reliability, the phase change that is detected; and
a change amount adjuster configured to adjust an amount of change in a phase change multiplied by the reliability,
wherein the change amount adjuster is implemented by:
i) computer executable instructions executed by at least one processor,
ii) at least one circuitry or
iii) a combination of computer executable instructions executed by at least one processor and at least one circuitry.

5. A non-transitory compute readable medium storing a program for causing a computer to operate as the image processing apparatus according to claim 1.

6. An image processing method executed by an image processing apparatus, the image processing method comprising:
detecting, from among phase changes in a luminance image, phase changes in multiple predetermined directions in units of mutually different resolutions; and
estimating reliability of a phase change of the phase changes that are detected based on temporal amplitude change information in multiple directions determined in the luminance image.

* * * * *